US012600879B2

(12) United States Patent (10) Patent No.: US 12,600,879 B2
Liang et al. (45) Date of Patent: Apr. 14, 2026

(54) COATED LENS AND METHOD FOR MANUFACTURING THE SAME

(71) Applicant: Carl Zeiss Vision International GmbH, Aalen (DE)

(72) Inventors: Jingye Liang, Guangdong (CN); Liu Ouyang, Guangzhou (CN)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/816,249

(22) Filed: Aug. 27, 2024

(65) Prior Publication Data

US 2024/0417588 A1 Dec. 19, 2024

Related U.S. Application Data

(63) Continuation of application No. PCT/EP2023/057082, filed on Mar. 20, 2023.

(30) Foreign Application Priority Data

Mar. 18, 2022 (WO) ................ PCT/CN2022/081592

(51) Int. Cl.
| | |
|---|---|
| *C09D 163/00* | (2006.01) |
| *B29D 11/00* | (2006.01) |
| *B29K 75/00* | (2006.01) |
| *C08G 59/32* | (2006.01) |

(Continued)

(52) U.S. Cl.
CPC ...... C09D 163/00 (2013.01); B29D 11/00317 (2013.01); B29D 11/00865 (2013.01); C08G 59/32 (2013.01); C08G 59/4007 (2013.01);

*G02B 1/11* (2013.01); *B29K 2075/00* (2013.01); *B29K 2909/08* (2013.01)

(58) Field of Classification Search
CPC ........... C09D 163/00; B29D 11/00865; B29D 11/00317
USPC ......................................................... 428/141
See application file for complete search history.

(56) References Cited

U.S. PATENT DOCUMENTS

| | | | |
|---|---|---|---|
| 4,211,823 A | 7/1980 | Suzuki et al. |
| 5,015,523 A | 5/1991 | Kawashima et al. |
| 2002/0111390 A1 | 8/2002 | Lin et al. |

(Continued)

FOREIGN PATENT DOCUMENTS

| | | |
|---|---|---|
| CN | 107870381 A | 4/2018 |
| CN | 108604021 A | 9/2018 |

(Continued)

OTHER PUBLICATIONS

Machine_English_translation_CN_109633925_A; Chen, H., et al.; Flexible refractive film patch with microstructure; Apr. 16, 2019; EPO ; whole document (Year: 2025).*

(Continued)

*Primary Examiner* — Tahseen Khan
(74) *Attorney, Agent, or Firm* — Qubit IP, PLLC

(57) ABSTRACT

A coated lens has a stamping which contains one or more ring-shaped focusing structures. A method for manufacturing such a coated lens is provided in which a coating composition is stamped. The coating composition includes at least one of an epoxide component and a (meth)acrylate component. The ring-shaped focusing structure(s) provide an additional power compared to the central clear zone of the coated lens.

18 Claims, 2 Drawing Sheets

(51) Int. Cl.
  *C08G 59/40* (2006.01)
  *G02B 1/11* (2015.01)

(56) References Cited

U.S. PATENT DOCUMENTS

| | | | |
|---|---|---|---|
| 2003/0165698 A1 | 9/2003 | Vaneeckhoutte et al. | |
| 2005/0171231 A1 | 8/2005 | Diggins | |
| 2007/0238804 A1* | 10/2007 | Ho | A61K 6/20 |
| | | | 522/77 |
| 2008/0316558 A1 | 12/2008 | Defranco | |
| 2009/0189303 A1 | 7/2009 | Diggins et al. | |
| 2011/0058142 A1 | 3/2011 | Berit-Debat et al. | |
| 2017/0131567 A1 | 5/2017 | To et al. | |
| 2019/0004330 A1 | 1/2019 | Dobschal et al. | |
| 2019/0227342 A1 | 7/2019 | Brennan et al. | |
| 2020/0310002 A1 | 10/2020 | Zheng et al. | |
| 2021/0263194 A1* | 8/2021 | Schnee | G02B 1/002 |
| 2021/0356763 A1* | 11/2021 | Le Saux | G02C 7/022 |
| 2026/0001291 A1* | 1/2026 | Liu | B29D 11/00326 |

FOREIGN PATENT DOCUMENTS

| | | | | |
|---|---|---|---|---|
| CN | 109633925 A | * | 4/2019 | |
| CN | 111103701 A | | 5/2020 | |
| CN | 213659117 U | | 7/2021 | |
| EP | 0614957 A1 | | 9/1994 | |
| EP | 2092377 A1 | | 5/2008 | |
| EP | 2578649 A1 | | 4/2013 | |
| EP | 3561578 A1 | | 10/2019 | |
| JP | 2010208911 A | | 9/2010 | |
| WO | 2019166659 A1 | | 9/2019 | |
| WO | 2020078964 A1 | | 4/2020 | |
| WO | 2020180817 A1 | | 9/2020 | |
| WO | 2020261213 A1 | | 12/2020 | |
| WO | WO-2021069443 A1 | * | 4/2021 | ........ G01M 11/0228 |
| WO | 2021258339 A1 | | 12/2021 | |
| WO | 2022251713 A1 | | 12/2022 | |
| WO | 2023155984 A1 | | 8/2023 | |

OTHER PUBLICATIONS

Office Action by the Chinese Patent Office (CNIPA) issued in CN202380040881.7, which is a counterpart hereof, mailed on Dec. 19, 2025, and English-language machine translation thereof.

Office Action by the Chinese Patent Office (SIPO) issued in CN202380040881.7, which is a counterpart hereof, mailed on Feb. 17, 2025, and English-language translation thereof.

Office Action by the Chinese Patent Office (CNIPA) issued in CN202380040881.7, which is a counterpart hereof, mailed on Aug. 19, 2025, and English-language translation thereof.

Weir, "Compressibility of Natural and Synthetic High Polymers at High Pressures," Journal of Research of the National Bureau of Standards, pp. 207 to 212, vol. 46, No. 3, Mar. 1951.

Industrial Norm "Ophthalmic optics—Spectacle lenses—Vocabulary (ISO 13666:2019)," English version EN ISO ISO 13666:2019, Dec. 2019.

Li et al., "Influence of Lenslet Configuration on Short-Term Visual Performance in Myopia Control Spectacle Lenses," frontiers in Neuroscience, vol. 15, Article 667329, May 2021.

International Search Report and Written Opinion issued in PCT/EP2023/057082, to which this application claims priority, mailed Jul. 14, 2021.

Warfield et al., "Compressibility of Bulk Polymers," Polymer Engineering and Science, vol. 6, Issue 2, pp. 176 to 180, Apr. 1, 1966.

International Search Report and Written Opinion issued in PCT/CN2022/081592, to which this application claims priority, mailed Nov. 9, 2022.

International Preliminary Report on Patentability issued in PCT/EP2023/057082, to which this application claims priority, mailed Feb. 2, 2024.

* cited by examiner

COATED LENS AND METHOD FOR MANUFACTURING THE SAME

CROSS REFERENCE TO RELATED APPLICATIONS

This application is a continuation application of international patent application PCT/EP2023/057082, filed on Mar. 20, 2023 and designating the U.S., which claims priority to international patent application PCT/CN2022/081592, filed on Mar. 18, 2022, both of which are hereby incorporated by reference in their entireties.

TECHNICAL FIELD

The present disclosure relates to a coated lens having a coating based on a stamping and a method for manufacturing a coated lens having a coating based on a stamping.

BACKGROUND

WO 2020/078964 A1, on which the disclosure is based, discloses an optical article comprising a base lens substrate and an abrasion resistant coating, the abrasion resistant coating forming at least one optical element protruding from one of the surfaces of the abrasion resistant coating. According to paragraph [063] of WO 2020/078964 A1, the abrasion resistant coating may be prepared from compositions comprising at least one alkoxysilane and/or one hydrolysate thereof, obtained by hydrolysis with a hydrochloric acid solution. According to paragraph [064], the abrasion resistant coating may be based on epoxysilane hydrolysates as described in EP 0 614 957 A1, U.S. Pat. Nos. 4,211,823, and 5,015,523. EP 0 614 957 A1 discloses in examples 1 to 4, comparative example 5, and examples 6 to 10, the use of methanol or colloidal silica in methanol, in example 11 additionally the use of toluene, in the respective composition for preparing the abrasion resistant coating. U.S. Pat. No. 4,211,823 discloses in examples 1 to 3, 6, 8 to 11 the use of methanol silica sol, in example 4 the use of an aqueous colloidal silica condensate and ethyl alcohol, in examples 5 and 7 the use of an aqueous colloidal silica condensate and a mixture of isopropanol and n-butanol, in examples 12 and 13 the use of methanol silica sol, diacetonealcohol and n-butylalcohol, in examples 14, 15 and 20 the use of methanol silica sol and diacetonealcohol and benzylalcohol, in examples 16 and 17 the use of methanol silica sol and methanol, in example 18 and 19 the use of methanol silica sol, benzylalcohol and methanol in the respective composition for preparing the abrasion resistant coating. U.S. Pat. No. 5,015,523 discloses the preparation of the silicon hard coating solutions H1 to H5 each containing colloidal silica in isopropanol or methanol and isopropanol, methanol and/or ethanol. Further, according to paragraphs [066] and [067] of WO 2020/078964 A1, the abrasion resistant coating may have a bi-layered structure as disclosed in EP 2 092 377 A1. All examples given in EP 2 092 377 A1 for the compositions of the lower layer and the upper layer of the respective abrasion resistant coating are each containing methanol, deionized water, 1-methoxypropan-2-ol and/or methyl ethyl ketone. According to paragraph [068] of WO 2020/078964 A1 the abrasion resistant coating that may be used in additive manufacturing or inkjet printing is disclosed in U.S. 2007/0238804 A1. According to the examples given U.S. 2007/0238804 A1 the solvents are distilled off before application.

WO 2020/078964 A1 describes several methods for manufacturing the optical article such as molding, additive manufacturing, or thermal embossing. Thermal embossing may be used when an optical article in which the optical elements protrude from a surface facing away from the base lens substrate is to be obtained. The abrasion resistant coating is applied to a surface by, for example, dip coating, UV or thermally cured and then embossed involving pressure and temperature. The optical elements may be regularly distributed along circles centered on the optical center of the refraction area:

The optical elements on the circle of diameter 10 mm and centered on the optical center of the refraction area may be micro lenses having a mean sphere of 2.75 D.

The optical elements on the circle of diameter 20 mm and centered on the optical center of the refraction area may be micro lenses having a mean sphere of 4.75 D.

The optical elements on the circle of diameter 30 mm and centered on the optical center of the refraction area may be micro lenses having a mean sphere of 5.5 D.

The optical elements on the circle of diameter 40 mm and centered on the optical center of the refraction area may be micro lenses having a mean sphere of 5.75 D.

EP 3 561 578 A1 discloses in FIGS. 14a and 14b and describes in paragraph [0102] a spectacle lens having a clear zone and cylindrical concentric rings. No dimensions are given for the cylindrical concentric rings. According to paragraph [0161] of EP 3 561 578 A1 every circular zone should have a radius between 2 and 4 mm comprising a geometrical center located at a distance of the optical center of the spectacle lens greater or equal to the radius+5 mm, the ratio between the sum of areas of the parts of cylindrical concentric rings located inside the circular zone and the area of the circular zone is comprised between 20% and 70%.

WO 2019/166659 A1 discloses in FIGS. 11a and 11b and describes on page 20, lines 10 to 12, the same type of a spectacle lens having a clear zone and cylindrical concentric rings as mentioned before with respect to the FIGS. 14a and 14b of EP 3 561 578 A1. Again, WO 2019/66659 A1, does not disclose dimensions for the cylindrical concentric rings. According to page 28, lines 13 to 18, the ratio, defined as in paragraph [0161] of EP 3 561 578 A1, is comprised between 20% and 70%, between 30% and 60%, or between 40% and 50%. Further, WO 2019/166659 A1 discloses in FIG. 1 and describes on page 20, lines 5 to 7, optical elements as micro lenses positioned along a set of five concentric rings. According to page 17, lines 1 to 5, the optical elements have a contour shape being inscribable in a circle having a diameter greater than or equal to 0.8 mm and smaller than or equal to 3.0 mm.

CN 111103701 A discloses in FIG. 3 a spectacle lens with a central optical region. The central optical region is a circular region within a specified radius in the range of 5 mm to 10 mm. Outside of the central optical region, cylindrical microstructures are arranged in a ring-shaped manner. The radial widths of the cylindrical microstructures are specified to be in a range of 0.5 mm to 2 mm. The distance between the cylindrical microstructures of different rings is in the range of 0.5 mm to 3 mm.

SUMMARY

It is an object of the present disclosure to provide a spectacle lens comprising a structurable coating composition. The structurable coating composition should be compatible with different optical materials and integrable into a common coating sequence of a spectacle lens. The object was further to provide an efficient method for manufacturing such a spectacle lens.

Exemplary embodiments, which might be realized in an isolated fashion or in any arbitrary combination, are discussed in detail below.

The coated lens according to the disclosure comprises a coating composition, the coating composition comprises a stamping. The coating composition comprises at least one component selected from the group consisting of at least one epoxide component and at least one (meth)acrylate component.

A coated lens is according to ISO 13666:2019(E), section 3.18.1, a lens to which one or more surface layers have been added to alter one or more properties of the lens. A lens or spectacle lens is according to ISO 13666:2019(E), section 3.5.2, an ophthalmic lens worn in front of, but not in contact with, the eyeball.

The coated lens comprises a coating, the coating comprises a stamping, the coating is based on a coating composition comprising at least one component selected from the group consisting of at least one epoxide component and at least one (meth)acrylate component, the stamping is having in a domain of the stamping a surface power which is different to a surface power of a lens surface of the coated lens comprising the coating outside the domain of the stamping.

The lens surface of the coated lens may be either a front surface or a back surface thereof. The surface power is as defined in ISO 13666:2019(E), section 3.10.4. The domain of the stamping is explained below with respect to the surface topography of the stamping.

Typically, the coating composition comprises the at least one epoxide component and the at least one (meth)acrylate component in a weight ratio selected from at least one of the following ranges:

a weight ratio of epoxide component to (meth)acrylate component being within a range of from 0.64 to 4.3, a weight ratio of epoxide component to (meth)acrylate component being within a range of from 0.7 to 4.1, a weight ratio of epoxide component to (meth)acrylate component being within a range of from 0.8 to 4.0, a weight ratio of epoxide component to (meth)acrylate component being within a range of from 1.0 to 3.0.

Typically, the coating composition comprises the at least one epoxide component in a total amount within a range selected from at least one of the following ranges:

the total amount being within a range of from 39% by weight to 81% by weight, the total amount being within a range of from 45% by weight to 75% by weight, the total amount being within a range of from 50% by weight to 70% by weight, the total amount being within a range of from 55% by weight to 65% by weight, each total amount of the at least one epoxide component being based on the total weight of the sum of the at least one epoxide component and the at least one (meth)acrylate component, and the at least one (meth)acrylate component in a total amount within a range selected from at least one of the following ranges:

the total amount being within a range of from 19% by weight to 61% by weight, the total amount being within a range of from 25% by weight to 55% by weight, the total amount being within a range of from 30% by weight to 50% by weight, the total amount being within a range of from 35% by weight to 45% by weight, each total amount of the at least one (meth)acrylate component being based on the total weight of the sum of the at least one epoxide component and the at least one (meth) acrylate component.

Typically, the coating composition is having a viscosity within a range selected from at least one of the following ranges:

the viscosity being within a range of from 50 mPas to 600 mPas, the viscosity being within a range of from 100 mPas to 500 mPas, the viscosity being within a range of from 150 mPas to 400 mPas, the viscosity being within a range of from 250 mPas to 350 mPas, each viscosity being determined using an Ubbelohde viscometer at a working temperature being within a range selected from at least one of the following ranges:

the working temperature being within a range of from −20° C. to 100° C., the working temperature being within a range of from 0° C. to 60° C., the working temperature being within a range of from 10° C. to 40° C., the working temperature being within a range of from 17° C. to 30° C.

Coating composition refers to a state before cure. Coating refers to a state after cure.

Before cure, the coating composition is formable or structurable to result in the stamping. Before cure, the coating composition typically is formable or structurable at a given working temperature, for example, at 22° C.±0.5° C. Before cure, the coating composition typically is additionally characterized by at least one of the following features selected from the group consisting of:

Typically the working temperature is within a range of from −20° C. to 100° C., further typically within a range of from 0° C. to 60° C., further typically within a range of from 10° C. to 40° C., more typically within a range of from 17° C. to 30° C., and most typically at ambient temperature.

Typically the viscosity of the coating composition at the working temperature is within a range of from 50 mPas to 600 mPas, further typically within a range of from 100 mPas to 500 mPas, more typically within a range of from 150 mPas to 400 mPas, and most typically within a range of from 250 mPas to 350 mPas. The viscosity of the coating composition typically is determined at the working temperature using an Ubbelohde viscometer.

Typically the yellowness index of the coating composition is within a range of from 0.5 to 10.0, further typically from 0.5 to 6.0, more typically from 0.5 to 5.0, most typically from 0.5 to 4.0. The yellowness index typically is measured in a quartz cuvette with a thickness of 2.0 mm using the spectrophotometer UltrascanPro, company HunterLab.

Typically the coating composition is involved in at least one curing reaction, typically a UV curing reaction and/or a thermal curing reaction. Further typically, the coating composition is in a first step precured via a UV curing reaction, i.e., the curing reaction is initialized by irradiation with UV light, and is in a subsequent second step cured via a thermal curing reaction.

Typically the coating composition is UV curable. UV curable means that the coating composition is precured in a wavelength selected from a wavelength range of from 365 nm to 460 nm, more typically in the wavelength of 365 nm or in the wavelength of 400 nm, typically by using a LED curing lamp, further typically by using a LED curing lamp curing with a wavelength selected from a wavelength range of from 365 nm to 460 nm, more typically with the wavelength of 365 nm or with the wavelength of 400 nm, each within a range of from 20 s to 100 s. UV curable further means that the coating composition is precured with a UV intensity or UV dose selected from a range of from 4 J/cm$^2$ to 20 J/cm$^2$, further typically from 5 J/cm$^2$ to 17 J/cm$^2$, more typically from 7 J/cm$^2$ to 15 J/cm$^2$ and most typically from 9 J/cm$^2$ to 11 J/cm$^2$. UV curable typically means that the coating composition is precured by using a LED curing lamp, the curing lamp curing with a wavelength of 365 nm and/or with a wavelength of 400 nm, with a UV dose of 8 J/cm$^2$ to 12 J/cm$^2$ and within a range of 20 s to 100 s.

Typically the coating composition is thermally curable. Thermally curable means that the coating composition is curable by the application of heat, typically in an oven. Thermally curable means that the coating is typically cured in a temperature range of from 90° C. to below the glass transition temperature TG Of the lens substrate. Thermally curable further means that the coating is cured in a temperature range of from 95° C. to 125° C., more typically from 100° C. to 120° C. and most typically from 105° C. to 115° C., each typically within a range 2 h to 4 h, further typically within a range of 2.5 h to 3.5 h.

Typically the coating composition comprises at least one epoxide component and/or at least one (meth)acrylate component. The at least one epoxide component may be selected from the group consisting of trimethylolpropane triglycidyl ether [CAS No. 30499-70-8], trimethylolethane triglycidyl ether, tris(4-hydroxyphenyl) methane triglycidyl ether [CAS No. 66072-38-6], 1,3-butandiol diglycidyl ether [CAS No. 3332-48-7], 1,4-butanediol diglycidyl ether [CAS No. 2425-79-8], poly (ethylene glycol) diglycidyl ether [average molecular weight 500, 2000, CAS No. 26403-72-5], poly(propylene glycol) diglycidyl ether [average molecular weight ~380, ~640, CAS No. 26142-30-3], neopentyl glycol diglycidyl ether [CAS No. 17557-23-2], 3,4-epoxycyclohexylmethyl 3,4-epoxycyclohexanecarboxylate [CAS No. 2386-87-0], bisphenol A diglycidyl ether [CAS No. 1675-54-3], triphenylolmethane triglycidyl ether [CAS No. 660272-38-6], trisphenol triglycidyl ether [CAS No. 66072-38-6], tetraphenylol ethane triglycidyl ether [CAS No. 37237-76-6], 1,2,6-hexanetriol triglycidyl ether [CAS No. 68959-23-9], glycerol triglycidyl ether [CAS No. 13236-02-7], 2-butyne-1,4-diol diglycerol ether [CAS No. 68411-16-5], propoxylated glycerine triglycidyl ether [CAS No. 37237-76-6], ethylene glycol diglycidyl ether [CAS No. 2224-15-9], 1,4-butanediol diglycidyl ether [CAS No. 2425-79-8], neopentyl glycol diglycidyl ether [CAS No. 17557-23-2], cyclohexanedimethanol diglycidyl ether [CAS No. 14228-73-0], dipropylene glycol diglycidyl ether [CAS No. 28877-93-2], dibromoneopentyl glycol diglycidyl ether [CAS No. 29953-15-9] and 3,4-epoxycyclohexylcarboxyl at [CAS No. 2386-87-0]. Typically, the at least one epoxide component is selected from the group consisting of trimethylolpropane triglycidyl ether, trimethylolethane triglycidyl ether, tris(4-hydroxyphenyl)methane triglycidyl ether, triphenylolmethane triglycidyl ether, trisphenol triglycidyl ether, tetraphenylol ethane triglycidyl ether, 1,2,6-hexanetriol triglycidyl ether and glycerol triglycidyl ether. Further typically, the at least one epoxide component is selected from the group consisting of trimethylolpropane triglycidyl ether, trimethylolethane triglycidyl ether, and triphenylolmethane triglycidyl ether.

The at least one (meth)acrylate component may be selected from the group consisting of pentaerythritol tetraacrylate [CAS No. 4986-89-4], trimethylolpropane triacrylate [CAS No. 15625-89-5], trimethylolpropane trimethacrylate [Cas No. 3290-92-4], dipentaerythritol penta-/hexaacrylate [CAS No. 60506-81-2], 1,6-hexanedioldiacrylate [CAS No. 13048-33-4], tetramethylolmethane triacrylate, trimethylolpropanetriethylene glycol triacrylate, pentaerythritol tetramethacrylate, dipentaerythritol hexaacrylate, urethaneoligomer tetraacrylate, urethane oligomer hexamethacrylate, urethane oligomer hexaacrylate, polyester oligomer hexaacrylate, diethylene glycol dimethacrylate, tripropylene glycol dimethacrylate, tetraethylene glycol dimethacrylate, tripropylene glycol dimethacrylate, bisphenol A dimethacrylate, 2,2-bis(4-methacryloyloxyethoxyphenyl) propane, glycidyl methacrylate, 2,2-bis(4-acryloyloxypolyethylene glycol phenyl)propane, poly(ethylene glycol) methylether methacrylate [CAS No 36915-72-0]. Typically, the at least one (meth)acrylate component is selected from the group consisting of pentaerythritol tetraacrylate, pentaerythritol tetramethacrylate, trimethylolpropane triacrylate, dipentaerythritol hexaacrylate and urethaneoligomer tetraacrylate. Further typically, the at least one (meth)acrylate component is selected from the group consisting of pentaerythritol tetraacrylate, pentaerythritol tetramethacrylate and trimethylolpropane triacrylate.

In case the coating composition comprises at least one epoxide component and at least one (meth)acrylate component, the weight ratio between the at least one epoxide component and the at least one (meth)acrylate component typically is in a range of epoxide component/(meth)acrylate component from 0.64 to 4.3, further typically from 0.7 to 4.1, more typically from 0.8 to 4.0 and most typically from 1.0 to 3.0. In case the coating composition comprises at least one epoxide component and at least one (meth)acrylate component in a weight ratio of epoxide component/(meth) acrylate component typically within one of the before mentioned ranges, the at least one epoxide component and the at least one (meth)acrylate component typically is selected from the respective group mentioned before.

In case the coating composition comprises at least one epoxide component and at least one (meth)acrylate component, typically the total amount of the at least one epoxide component is within a range of from 39% by weight to 81% by weight, further typically from 45% by weight to 75% by weight, more typically from 50% by weight to 70% by weight, and most typically from 55% by weight to 65% by weight, and of the at least one (meth)acrylate component is within a range of from 19% by weight to 61% by weight, further typically from 25% by weight to 55% by weight, more typically from 30% by weight to 50% by weight, and most typically from 35% by weight to 45% by weight, each total amount being based on the total weight of the sum of the at least one epoxide component and the at least one (meth)acrylate component. With respect to the total weight of the sum, the total amount of the at least one epoxide component and the total amount of the at least one (meth) acrylate component are combined to add up to 100% by weight. The before mentioned ranges for the total amounts each apply to one single epoxide component or a mixture of different epoxide components as well as to one single (meth)acrylate component or a mixture of different (meth) acrylate components. In case the coating composition comprises at least one epoxide component and at least one (meth)acrylate component, typically within one of the total amount ranges for the at least one epoxide component and the at least one (meth)acrylate component given before, the at least one epoxide component and the at least one (meth) acrylate component typically is selected from the respective group mentioned before.

In case the coating composition comprises at least one epoxide component, i.e., in case the coating composition comprises the at least one epoxide component only and no additional (meth)acrylate component, the at least one epoxide component typically is based on cationic-polymerizing epoxy resins such as the ones commercially available as DELO KATIOBOND series, company DELO, in particular the pressure sensitive epoxy-based adhesive DELO KATIOBOND PS6372.

In case the coating composition comprises at least one (meth)acrylate component, i.e., in case the coating composition comprises the at least one (meth)acrylate component only and no additional epoxide component, the at least one (meth)acrylate component typically is based on modified acrylates such as the acrylate-based adhesives commercially available as DELO PHOTOBOND series, company DELO, in particular the pressure sensitive acrylate-based adhesive DELO PHOTOBOND PS4130.

Typically the coating composition comprising the at least one epoxide component and the at least one (meth)acrylate component comprises at least one catalyst. The at least one catalyst may be selected from the group consisting of triarylsulfonium salts, preferable triarylsulfonium hexafluorophosphate, 50% in propylene carbonate [CAS No. 109037-77-6, company Sigma Aldrich]; alpha-amino acetophenones, for example 2-methyl-1-[4-phenyl]-2-morpholinopropan-1-one [CAS No. 71868-10-5, Irgacure 907], 2-benzyl-2-dimethyl amino-1-(4-morpholinophenyl)-butanone-1 [CAS No. 119313-12-1, Irgacure 369]; monoacyl and bisacyl phosphine oxides and sulphides, such as phenylbis(2,4,6-trimethylbenzoyl)-phosphine oxide [CAS No. 162881-26-7, Irgacure 819].

Typically, the coating composition consisting of the at least one epoxide component, the at least one (meth)acrylate component and the at least one catalyst, each typically being selected from the respective group mentioned before, comprises the at least one catalyst typically in a total amount within a range of from 1% by weight to 4% by weight, further typically from 1.5% by weight to 3.5% by weight, more typically from 1.7% by weight to 3% by weight, and most typically from 2% by weight to 2.7% by weight, each total amount being based on the total weight of the coating composition.

Typically the coating composition is compatible with different optical materials a lens substrate may be based on. Further typically, the coating composition is compatible with common optical material of lens substrates, such as for example, 1.5 CR 39, 1.60 MR-8, 1.67 MR-7, 1.67 MR-10, 1.74 MR-174, 1.53 Trivex.

Typically the coating composition is compatible with various coating compositions applied to the coating composition.

The compatible means the coating composition presents sufficient wettability to the lens substrate to form a coating layer, the coating layer presents sufficient adhesion to the lens substrate, the coating layer does not present defects like bubbles, cracks and pinpoints because of unfavorable chemical reactions between the coating composition and the lens substrate.

Optionally, the coating composition comprises at least one photochromic dye. Such a photochromic coating composition may comprise two or three photochromic dyes. The photochromic dye(s) can be combined so that, for example, by additive color mixing, any desired photochromic color can be produced. Typically, the at least one photochromic dye is selected from the group consisting of naphthopyrans, spironaphthopyrans, oxazines, spironaphthoxazines, benzopyrans, spirobenzoxzines, spirobenzopyrans, spiropyrans, chromenes, fulgides, fulgimides, spirooxazines, organometal dithiozonates, triarylmethanes, stilbenes, azastilbenes, nitrones, quinones, and mixtures thereof. For instance, the photochromic dye(s) are selected from the group consisting of:

1,3-dihydrospiro[2H-anthra[2,3-d]imidazole-2,1'-cyclohexane]-5,10-dione;

1,3-dihydrospiro[2H-anthra[2,3-d]imidazole-2,1'-cyclohexane]-6,11-dione;

1,3-dihydro-4-(phenylthio)spiro[2H-anthra-1',2-diimidazole-2,1'-cyclohexane-6,11-dione;

1,3-dihydrospiro[2-H-anthra[1,2-d]imidazole-2,1'-cycloheptane]-6,11-dione-1,3,3-trimethylspiroindole-2,3'[3H]naphtho[2,1-b]-1,4-oxazine]2-methyl-3,3'-spiro-bi-[3H-naphtho[2,1-bipyran](2-Me);

2-phenyl-3-methyl-7-methoxy-8'-nitrospiro[4H]-1-benzopyran-4,3'-[3H]-naphtho[2,1-bipyran;

spiro[2H-1-benzopyran-2,9'-xanthene];

8-methoxy-1',3'-dimethylspiro(2H-1-benzopyran-2,2'-(1'H)-quinoline;

2,2'-spiro-bi-[2H-1-benzopyran];

5'-amino-1',3',3'-trimethylspiro[2H-1-benzopyran-2,2'-indoline;

ethyl-beta-methyl-beta-(3',3'-dimethyl-6-nitrospiro(2H-1-benzopyran-2,2'-indolin-1'-yl)-propenoate;

(1,3-propanediyl)bis[3',3'-dimethyl-6-nitrospiro[2H-1-benzopyran-2,2'-indoline];

3,3'-dimethyl-6-nitrospiro[2H-1-benzopyrano-2,2'-benzoxazoline];

6'-methylthio-3,3'-dimethyl-8-methoxy-6-nitrospiro[2H-1-benzopyran-2,2'-benzothiozoline];

(1,2-ethanediyl)bis[8-methoxy-3-methyl-6-nitrospiro[2H-1-benzopyran-2,2'-benzothiozoline];

N—N'-bis(3,3'-dimethyl-6-nitrospiro[2H-1-benzopyran-2,2'(3'H)-benzothioazol-6'-yl)decanediamide];

alpha-(2,5-dimethyl-3-furyl)ethylidene(Z)-ethylidenesuccinicanhydride;

alpha-(2,5-dimethyl-3-furyl)-alpha'-delta-dimethylfulgide;

2,5-diphenyl-4-(2'-chlorophenyl)imidazole;

(2',4'-dinitrophenyl)methyl]-1H-benzimidazole;

N—N-diethyl-2-phenyl-2H-phenanthro[9,10-d]imidazol-2-amine;

2-nitro-3-aminofluoren-2-amino-4-(2'-furanyl)-6H-1,3-thiazine-6-thione, and mixtures thereof.

Additionally or alternatively to the before exemplarily mentioned, the photochromic dye(s) can be selected from the group consisting of: CNN11, CNN12, CNN13, CNN14, CNN15, CNN16, CNN17 (K. K. Tokuyama, Tokyo, Japan), Reversacol Midnight Gray, Reversacol Pacific Blue, Reversacol Sunflower, Reversacol Corn Yellow (James Robinson, Ltd., Huddersfield, England), and mixtures thereof.

Typically, the photochromic dye(s) is/are present in an amount in a range of from 0.001 to 0.5% by weight, typically from 0.01 to 0.1% by weight, based on the total weight of the photochromic coating composition. The before mentioned ranges shall apply irrespective if only one single photochromic dye is comprised in the photochromic coating composition or if a mixture of different photochromic dyes are comprised in the photochromic coating composition.

The coated lens comprises a lens substrate, the lens substrate at least having a front surface and a back surface. The lens substrate comprises on at least one surface thereof a coating composition, the coating composition being described before. The lens substrate comprises on the front surface and/or on the back surface the coating composition. The coating composition on the front surface of the lens substrate comprises a surface facing away from the front surface of the lens substrate, at least the surface comprises a stamping. The coating composition on the back surface of the lens substrate comprises a surface facing away from the back surface of the lens substrate, at least the surface comprises a stamping. Typically, only the coating composition on the front surface of the lens substrate comprises a surface facing away from the front surface and at least the surface comprises a stamping.

For a coated lens comprising a lens substrate, the lens substrate at least having a front surface and a back surface, at least one of the front surface and the back surface being coated with a coating composition, the coating composition described before, the coating composition on the front surface comprises an outermost surface, i.e., a surface not being in contact with the front surface, the outermost surface being the outermost front surface of the coated lens, the coating composition on the back surface comprises an outermost surface, i.e., a surface not being in contact with the back surface, the outermost surface being the outermost back surface of the coated lens.

For the coated lens, the outermost surface comprises a stamping. In case, an additional coating or an additional coating composition is applied to the outermost surface, the additional coating or the additional coating composition again each comprises an outermost surface, i.e., a surface not being in contact with the outermost surface comprising the stamping, the outermost surface of the additional coating or the additional coating composition then is the outermost surface of the coated lens. The outermost surface of the additional coating or the additional coating composition may adapt to the stamping, i.e., essentially maintain a structure of the stamping, or completely cover the stamping, i.e., essentially maintain a surface topography of the respective surface of the lens substrate.

The front surface is according to ISO 13666:2019(E), section 3.2.13, the surface of the lens intended to be fitted away from the eye. In the context of the present disclosure, the front surface of the lens substrate is defined analogously, the front surface of the lens substrate is the surface of the lens substrate intended to be fitted away from the eye. The back surface is according to ISO 13666:2019(E), section 3.2.14, the surface of the lens intended to be fitted nearer to the eye. In the context of the present disclosure, the back surface of the lens substrate is defined analogously, the back surface of the lens substrate is the surface of the lens substrate intended to be fitted nearer to the eye.

In the context of the present disclosure, a stamping shall mean at least one of the following:

at least one protrusion on a coating composition, i.e., one protrusion or more protrusions on a coating composition, at least one protrusion protruding a surface of a coating composition, i.e., one protrusion or more protrusions protruding a surface of a coating composition, the surface facing away from a surface of a lens substrate comprising the coating composition, the surface being an outermost surface with respect to a surface of a lens substrate comprising the coating composition, the surface not being next or adjacent to a surface of a lens substrate comprising the coating, at least one protrusion on a coating, i.e., one protrusion or more protrusions on a coating, at least one protrusion protruding a surface of a coating, i.e., one protrusion or more protrusions protruding a surface of a coating, the surface of the coating facing away from a surface of a lens substrate comprising the coating, the surface being an outermost surface with respect to a surface of a lens comprising the coating, the surface not being next or adjacent to a surface of a lens substrate comprising the coating, at least one recess in a coating composition, i.e., one recess or more recesses in a coating composition, at least one recess in a surface of a coating composition, i.e., one recess or more recesses in a surface of a coating composition, the surface facing away from a surface of a lens substrate comprising the coating composition, the surface being an outermost surface with respect to a surface of a lens substrate comprising the coating composition, the surface not being next or adjacent to a surface of a lens substrate comprising the coating, at least one recess in a coating, i.e., one recess or more recesses in a coating, at least one recess in a surface of a coating, i.e., one recess or more recesses in a surface of a coating, typically the surface facing away from a surface of a lens substrate comprising the coating, the surface being an outermost surface with respect to a surface of a lens substrate comprising the coating, the surface not being next or adjacent to a surface of a lens substrate comprising the coating, a deviation from a surface topography of a coating composition, the deviation deviating from a surface topography of a surface of a lens substrate comprising the coating composition, a deviation from a surface topography of a coating, the deviation deviating from a surface topography of a surface of a lens substrate comprising the coating.

The protrusion or the recess each typically has an equivalent tangential radius within a range of from 10 mm to 300 mm, further typically from 30 mm to 250 mm, more typically from 50 mm to 200 mm and most typically from 70 mm to 180 mm.

The equivalent tangential radius is measured by a white light interferometer, typically a Bruker ContourGT-X in VXI measurement mode with the deduction of the surface curvature of the lens substrate.

The protrusion typically provides to a coating comprising the protrusion an additional power. The protrusion further typically provides in a domain of the protrusion an additional power to a front surface and/or a back surface of a coated lens comprising the protrusion with respect to the respective front surface or with respect to the respective back surface of the coated lens outside the domain of the protrusion. The domain of a stamping formed as protrusion is defined below. The additional power typically is selected from at least one the following ranges:

the additional power (ADD) is within a range of larger than 3 dioptres and equal to or lower than 14 dioptres;

the additional power (ADD) is within a range of larger than 5 dioptres and equal to or lower than 13 dioptres;

the additional power (ADD) is within a range of larger than 6 dioptres and equal to or lower than 12 dioptres.

The recess typically provides to a front surface and/or back surface of a coated lens comprising one coating or more coatings comprising the recess in a domain of the recess a difference in surface power with respect to a surface power of the respective front surface and/or the respective back surface outside the domain of the recess. The domain of a stamping formed as recess is defined below. The surface power is as defined in ISO 13666:2019(E), section 3.10.4 (surface power). The difference in surface power typically is selected from at least one the following ranges:

the difference in surface power is within a range of larger than 3 dioptres and equal to or lower than 14 dioptres;

the difference in surface power is within a range of larger than 5 dioptres and equal to or lower than 13 dioptres;

the difference in surface power is within a range of larger than 6 dioptres and equal to or lower than 12 dioptres.

The protrusion typically causes a difference in focal length with respect to a surface comprising the protrusion. The recess typically causes a difference in focal length with respect to a surface comprising the recess.

Typically, a stamping formed as protrusion or formed as recess causes in a domain of the stamping, i.e., in a domain of the protrusion or in a domain of the recess, a difference in surface power with respect to a surface power of a front surface of a coated lens comprising the stamping but outside the domain of the stamping and/or a difference in surface power with respect to a surface power of a back surface of a coated lens comprising the stamping outside the domain of the stamping.

Typically, a stamping provides in a domain of the stamping a surface power to a lens surface of a coated lens which is different from a surface power of a lens surface, i.e., a front surface and/or a back surface, of the coated lens comprising a coating with the stamping but outside the domain of the stamping. Typically, a difference in surface power is within at least one range selected from the following group of ranges:

the difference in surface power is within a range of larger than 3 dioptres and equal to or lower than 14 dioptres;

the difference in surface power is within a range of larger than 5 dioptres and equal to or lower than 13 dioptres;

the difference in surface power is within a range of larger than 6 dioptres and equal to or lower than 12 dioptres.

Typically, in case a stamping is forming one protrusion of a coated lens, the one protrusion comprises a surface topography selected from at least one of the following surfaces or pieced together from parts selected from at least one of the following surfaces:

a spherical surface as defined in ISO 13666:2019(E), section 3.4.1;

a part of a spherical surface;

a cylindrical surface as defined in ISO 13666:2019(E), section 3.4.2;

a part of a cylindrical surface;

an aspherical surface as defined in ISO 13666:2019(E), section 3.4.3;

a part of an aspherical surface;

a toroidal surface as defined in ISO 13666:2019(E), section 3.4.6;

a part of a toroidal surface;

an atoroidal surface as defined in ISO 13666:2019(E), section 3.4.7;

a part of an atoroidal surface;

a power-variation surface as defined in ISO 13666:2019 (E), section 3.4.10;

a part of a power-variation surface.

In case a stamping is forming more protrusions of a coated lens, each of the more protrusions typically comprises a surface topography selected from at least one surface or pieced together from parts of at least one surface mentioned before. Each of the more protrusions may comprise a surface topography selected from at least one of a same surface, may be pieced together from parts of a same surface, may comprise a different surface or may be pieced together from parts of different surfaces.

In case a stamping is forming one recess of one coating or more coatings of a coated lens, the one recess typically is assumed to comprise a surface topography of a respective front surface and/or a respective back surface of a lens substrate to which the coating(s) is/are added to. In case a stamping is forming more recesses of one coating or more coatings of a coated lens, each of the more recesses are assumed to comprise a surface topography of a respective front surface and/or a respective back surface of a lens substrate to which the coating(s) is/are added to.

The stamping of a coated lens typically comprises:

a domain on a front surface and/or on a back surface of a coated lens, the domain being part of one coating or more coatings added to the front surface and/or the back surface, the stamping typically being the domain on the front surface, or a domain of a front surface and/or of a back surface of a coated lens, the domain being part of one coating or more coatings added to the front surface and/or the back surface, the stamping typically being the domain of the front surface.

The stamping of the coated lens comprising the domain on the front surface and/or on the back surface typically is formed as a protrusion, typically as one protrusion or as more protrusions, which is/are part of one coating or more coatings added to a respective front surface and/or a respective back surface of a lens substrate, i.e., the stamping is elevated with respect to the one or more coating(s).

The stamping of the coated lens comprising the domain of the front surface and/or of the back surface typically is formed as a recess, typically as one recess or as more recesses, which is/are part of one coating or more coatings added to a respective front surface and/or respective back surface of a lens substrate, the one recess or the more recesses typically being caused by the one coating or the more coatings, i.e., the one or more coating(s) is/are elevated with respect to the stamping.

Typically, the stamping comprises a domain which is smaller than a respective front surface and/or a respective back surface of a coated lens comprising the stamping.

The stamping of the coated lens typically comprises the domain which is limited by an onset line. The onset line passes along each onset of the stamping. An onset of a stamping being formed as one protrusion or as one recess shall represent, typically along a circumference or along a perimeter of the one protrusion or the one recess, a first position in which a surface topography of the one protrusion or the one recess deviated from a surface topography of the front surface and/or the back surface of the coated lens comprising the stamping. The domain of the stamping being formed as one protrusion or as one recess typically is limited by one onset line only if within the domain a surface topography of the one protrusion or the one recess deviates in each discrete x,y,z position from a surface topography of the respective front surface and/or the respective back surface of the coated lens comprising the stamping, typically outside the domain occupied by the stamping. The domain of the stamping being formed as one protrusion or as one recess may be limited by an outer onset line and an inner onset line. The outer onset line passes along each outer onset of the stamping. The inner onset line passes along each inner onset of the stamping. An outer onset shall represent, typically along a circumference or along a perimeter of the one protrusion or the one recess, a first outer position in which a surface topography of the one protrusion or the one recess deviates from a surface topography of the front surface and/or the back surface of the coated lens comprising the stamping. An inner onset shall represent, typically along a stamping-free domain of surrounded or encircled by a same stamping, a first inner position in which a surface topography of a same one protrusion or a same one recess deviated from a respective font surface and/or a respective back surface of a coated lens comprising the stamping. The domain of the stamping being formed as one protrusion or as one recess typically is limited by an outer onset line and an inner onset line if within the domain a surface topography of the stamping is not deviating in each discrete x,y,z position from a surface topography of the respective front surface and/or the respective back surface of the coated lens comprising the stamping, typically outside the domain comprising the stamping. In case the stamping is formed as more protrusions or as more recesses, the before given explanation with respect to the domain shall apply as well. Typically, a surface normal at either an apex of a front surface of a coated lens or an apex of a back surface of a coated lens shall define an origin of an x,y,z coordinate system and a "z direction." An "x,y direction" shall be in a tangential plane to either the front surface at the apex or the back surface at the apex. An x direction and a y direction shall be perpendicular to each other in the tangential plane.

Typically, the stamping is having a surface power which is different to a surface power of at least one of a front surface of the coated lens comprising the stamping outside a domain occupied by the stamping, a back surface of the coated lens comprising the stamping outside a domain occupied by the stamping.

The surface power of the stamping is defined as in ISO 13666:2019(E), section 3.10.4 (surface power), as a local ability of a surface of the stamping to change the vergence of a bundle of rays incident at the surface. The surface power of the stamping typically is as in note 1 to the entry ISO 13666:2019(E), section 3.10.4, determined from a radius or radii of the surface of the stamping and a refractive index (3.1.5) of a material of the stamping and is calculated for light (3.1.2) incident or emergent in air. The refractive index may be an actual refractive index of the material of the stamping or a nominal value. Typically, the refractive index of the material of the stamping is assumed to be a same as a refractive index of an optical material of a lens substrate. Typically, the refractive index of the material of the stamping is assumed to be the same as the refractive index of the optical material of the lens substrate, irrespective of whether the stamping a) is part of one or more coating(s) added to a front surface and/or a back surface of the lens substrate or b) is caused by the one or more coating(s).

The surface power each of the front surface and the back surface of the coated lens is defined as in ISO 13666.2019 (E), section 3.10.4 (surface power), as local ability each of the front surface and the back surface of the coated lens to change the vergence of a bundle of rays incident at the surface. The surface power each of the front surface and the back surface is as in note 1 to the entry in ISO 13666:2019 (E), section 3.10.4, determined from a radius or radii of the front surface or the back surface of a lens substrate and a refractive index (3.1.5) of an optical material (3.3.1) of the lens substrate, and is calculated for light (3.1.2) incident or emergent in air. The refractive index may be an actual refractive index of the optical material or a nominal value. The surface power of each of the front surface and the back surface of the lens substrate is assumed to be a same as the surface power of the respective front surface or the respective back surface of the coated lens not considering the stamping and not considering one or more coating(s) added to the front surface and/or back surface of the lens substrate.

In the context of the present disclosure, a stamping further shall mean any structure into which the coating composition described before is structureable or formable. Any structure exemplarily means structures such as one lenslet or a plurality of the lenslets as disclosed in WO 2020/180817 A1, each having a diameter of 0.5 mm or more up to 5 mm, or a lenslet having an add power of +0.25 D or more up to 5.0 D or an add power of −0.25 D or less, each compared to the based optical power of the lens;

one optical element or a plurality of optical elements as disclosed in WO 2022/251713 A1, each having a desired shape and size;

one light modulating cell or a plurality of the light modulating cells disclosed in WO 2020/261213 A1 having a dimension and power as disclosed therein, for example in [00108], [00118], [00121], or [00122];

one island-shaped area or a plurality of the island-shaped areas disclosed in US 2017/0131567 A1, each having an area of about 0.50 to 3.14 mm$^2$, a circular shape of a diameter of about 0.8 to 2.0 mm and a distance between the island-shaped areas of equal to a value of a radius of diameter/2;

one optical element or a plurality of the optical elements disclosed in WO 2019/166659 A1, each having a contour shape that is inscribable in a circle having a diameter greater than or equal to 0.8 mm and smaller than or equal to 3.0 mm, the more than one optical elements may be arranged contiguously as defined on page 15, line 27 to page 16, line 8 of WO 2019/166659 A1 or non-contiguously;

one concentric ring or a plurality of the concentric rings disclosed in WO 2019/166659 A1, FIG. 11b, the concentric rings arranged spaced apart from each other;

one cylindrical microstructure or a plurality of the cylindrical microstructures disclosed in CN 111103701 A, each having a radial width of 0.5 mm to 2 mm, a distance between the different cylindrical microstructures is 0.5 mm to 3 mm;

one ring-shaped focusing structure having a width of equal or lower than 0.7 mm or a plurality of the ring-shaped focusing structures disclosed in PCT/EP2022/053854, each having a width of equal or lower than 0.7 mm and a spectacle lens comprising the more than one ring-shaped focusing structure is characterized by a surface-based fill factor defined as a surface area ratio of the surface area of an innermost of the ring-shaped focusing structures and a sum of the surface area of the innermost ring-shaped focusing structures and an area of a peripheral clear zone being larger than 17% and equal or lower than 70% for the width in a range of 0.6 mm to 0.7 mm.

A stamping typically structures or forms the coating composition described before in a ring-shaped structure. The structure shall be considered as ring-shaped if it surrounds a structure-free zone and there is a path within the structure which runs from a starting point within the structure around the structure-free zone and to the starting point again.

In the context of the present disclosure, a stamping further shall mean at least one ring-shaped focusing structure. The ring-shaped focusing structure typically applies to structures providing a ring-shaped focal line as well as to structures comprising a plurality of lenslets adjoining each other such that they form a ring of contiguously connected lenslets and providing a plurality of foci along a ring-shaped line. The plurality of foci may be equidistantly arranged and typically mainly line-shaped or point-shaped. At least one ring-shaped focusing structure means one ring-shaped focusing structure or more ring-shaped focusing structures.

A structure providing a ring-shaped focal line is for example shown in FIGS. 14a and 14b and described in paragraph [0102] of EP 3 561 578 A1 or in FIGS. 11a and 11b and described on page 20, lines 10 to 12, of WO 2019/166659 A1. Other variants of such structures providing a ring-shaped focal line are disclosed in FIG. 1 of CN 111103701 A or in FIGS. 5A and 5B of US 2019/0227342 A1.

In front view, i.e., if viewed perpendicular onto the front surface of the coated lens, ring-shaped does not necessarily need to be circular. Non-circular, elliptical, or otherwise curved ring-shaped as shown for example in FIG. 1 of CN 213659117 U is possible as well.

The lenslets do not necessarily have to be circular lenslets if viewed in front view, i.e., if viewed perpendicular onto the front surface of the coated lens. For example, ring-shaped focusing structures comprising a plurality of lenslets adjoining each other may comprise structures like those described in WO 2019/166659 A1, page 17, line 25, to page 19, line 8 with reference to FIG. 1 shown therein.

In the context of the present disclosure, the term "lenslet" refers to a small convex structure in the approximately spherical, ellipsoidal, sinusoidal, or similar shape of a lens that is provided on a surface of a coated lens. This small convex structure has lateral dimensions that are several orders of magnitude smaller than the dimensions of the coated lens itself.

In case of the lenslets being small convex structures, lenslets are considered to adjoin each other in case there is a path between the centers of two lenslets that does not pass an area having solely the shape of the surface on which the lenslets are formed.

In the context of the present disclosure, the term "lenslet" refers to a small concave structure in the approximately spherical, ellipsoidal, sinusoidal, or similar shape of a lens that is provided in a surface of a coated lens. This small concave structure has lateral dimensions that are several orders of magnitude smaller than the dimensions of the coated lens itself.

In case of the lenslets being small concave structures, lenslets are considered to adjoin each other in case there is a path between the centers of two lenslets that does not pass an area having solely the shape of the surface on which the lenslets are formed.

Further details with respect to the ring-shaped focusing structure are given below in the context with the respective coated lens.

The coated lens comprises a lens substrate, the lens substrate being based on an optical material. The optical material, according to ISO 13666:2019(E), section 3.3.1, a transparent material capable of being manufactured into optical components, may be either a glass, a thermosetting hard resin or a thermoplastic hard resin. According to ISO 13666:2019(E), section 3.3.2, a glass, inorganic glass or mineral glass is a material formed by the fusion of inorganic substance, cooled down and solidified without crystallizing. According to ISO 13666:2019(E), section 3.3.3, a thermosetting hard resin is a plastic material, consisting principally of organic polymers, that has been cured into an essentially infusible and insoluble state, and cannot be usefully reshaped on heating. According to ISO 13666:2019(E), section 3.3.4, a thermoplastic hard resin is a plastic material consisting principally of organic polymers, that can be repeatedly softened by heating and hardened by cooling, and in the softened state can be shaped by flow into lenses or blanks by molding, extrusion, and forming. Typically, the lens substrate is based on a single optical material selected from the group consisting of a thermosetting hard resin and a thermoplastic hard resin.

The lens substrate may be clear according to the definition given in ISO 13666:2019 (E), section 3.5.7, for a clear lens, absorptive according to the definition given in ISO 13666:2019(E), section 3.5.5, for an absorptive lens, tinted according to the definition given in ISO 13666:2019(E), section 3.5.6, for a tinted lens, photochromic according to the definition given in ISO 13666:2019(E), section 3.5.11, for a photochromic lens, or polarizing according to the definition given in ISO 13666:2019(E), section 3.5.12, for a polarizing lens.

Typically, the lens substrate is clear, i.e., with no intended color/tint in transmission.

Further, the lens substrate may be classified according to the state of manufacture as blank, the blank being defined in ISO 13666:2019(E), section 3.8.1, as piece of optical material with one optically finished surface for the making of a lens, single-vision blank, the single-vision blank being defined in ISO 13666:2019(E), section 3.8.2, as blank with the finished surface having a single nominal surface power, multifocal blank, the multifocal blank being defined in ISO 13666:2019(E), section 3.8.3, as blank with the finished surface having two or more visibly divided portions of different dioptric powers or focal powers, progressive-power blank, the progressive-power blank being defined in ISO 13666:2019(E), section 3.8.5, as power-variation blank where the finished surface is a progressive-power surface, degressive-power blank, the degressive-power blank being defined in ISO 13666:2019(E), section 3.8.6, as power-variation blank where the finished surface is a degressive-power surface, finished lens, the finished lens being defined in ISO 13666:2019(E), section 3.8.7, as lens of which both sides have their final optical surface, uncut lens, the uncut lens being defined in ISO 13666:2019(E), section 3.8.8, as finished lens prior to edging, or as edged lens, the edged lens being defined in ISO 13666:2019(E), section 3.8.9, as finished lens edged to final size and shape.

The lens substrate typically is uncoated. If one of the before mentioned blanks shall comprise a coating composition or a coating, the respective final optical surface comprises the coating composition or the coating. If one of the before mentioned lenses shall comprise a coating composition or a coating, at least one side thereof comprises the coating composition or the coating.

Typically, the lens substrate is a blank or an uncut lens.

Alternatively, the lens substrate may be classified according to the form as an afocal lens with nominally zero dioptric power according to ISO 13666:2019(E), section 3.6.3, or according to the function as corrective lens according to ISO 13666:2019(E), section 3.5.3, as a lens with dioptric power.

Alternatively, the lens substrate may be classified according to the type as single-vision lens according to ISO 13666:2019(E), section 3.7.1, position-specific single-vision lens according to ISO 13666:2019(E), section 3.7.2, multifocal lens according to ISO 13666:2019(E), section 3.7.3, bifocal lens according to ISO 13666:2019(E), section 3.7.4, trifocal lens according to ISO 13666:2019(E), section 3.7.5, fused multifocal lens according to ISO 13666:2019(E), section 3.7.6, power-variation lens according to ISO 13666:2019(E), section 3.7.7, progressive-power lens according to ISO 13666:2019(E), section 3.7.8, or as degressive-power lens according to ISO 13666:2019(E), section 3.7.9.

Typically, the lens substrate is a single-vision lens, i.e., a lens designed to provide a single dioptric power.

In accordance with the different variants or classifications of the lens substrate given before, the front surface of the lens substrate and/or the back surface of the lens substrate each may have the surface topography of a(n)

spherical surface according to ISO 13666:2019(E), section 3.4.1, cylindrical surface according to ISO 13666:2019(E), section 3.4.2, aspherical surface according to ISO 13666:2019(E), section 3.4.3, toroidal surface according to ISO 13666:2019(E), section 3.4.6, atoroidal surface according to ISO 13666:2019(E), section 3.4.7, power-variation surface according to ISO 13666:2019(E), section 3.4.10, or a meridionally-compensated aspherical surface according to ISO 13666:2019(E), section 3.4.11.

Typically, at least the front surface is having the surface topography of a spherical surface, i.e., part of the inside or outside surface of a sphere.

Additionally to the before mentioned surface topographies for the front surface and/or the back surface of the lens substrate, the front surface of the lens substrate and/or the back surface of the lens substrate may comprise at least one protrusion typically with projected diameter ranges from 0.2 mm to 2 mm, further typically from 0.3 mm to 1.8 mm, more typically form 0.4 mm to 1.5 mm and most typically 0.5 mm to 1.4 mm, at least one recess with projected diameter ranges from 0.2 mm to 2 mm, further typically from 0.3 mm to 1.8 mm, more typically form 0.4 mm to 1.5 mm and most typically 0.5 mm to 1.4 mm, at least one ring-shaped focusing structure, with tangential width of the ring ranges from 0.2 mm to 2 mm, further typically from 0.3 mm to 1.8 mm, more typically form 0.4 mm to 1.5 mm and most typically 0.5 mm to 1.4 mm, i.e., the front surface of the lens substrate and/or the back surface of the lens substrate may comprise one protrusion or more protrusions, one recess or more recesses, one ring-shaped focusing structure or more ring-shaped focusing structures.

The equivalent projected diameter ranges and the tangential width, i.e., a width in tangential direction, each is measured by a white light interferometer, typically a Bruker ContourGT-X in VXI measurement mode with the deduction of the surface curvature of the lens substrate.

Typically, at least the front surface of the lens substrate may comprise at least one of the at least one protrusion, the at least one recess and the at least one ring-shaped focusing structure. Further typically, only the front surface of the lens substrate may comprise at least one of the at least one protrusion, the at least one recess and the at least one ring-shaped focusing structure. The front surface and/or the back surface of the lens substrate may comprise the at least one ring-shaped focusing structure in form of at least one recess or in form of at least one protrusion. The front surface of the lens substrate may comprise the at least one ring-shaped focusing structure a) in form of at least one recess, b) in form of at least one protrusion or c) in form of at least one recess and at least one protrusion. The back surface of the lens substrate may comprise the at least one ring-shaped focusing structure a) in form of at least one recess, b) in form of at least one protrusion or c) in form of at least one recess and at least one protrusion. Typically, at least the front surface of the lens substrate may comprise the at least one ring-shaped focusing structure a) in form of at least one recess, b) in form of at least one protrusion or c) in form of at least one recess and at least one protrusion. Further typically, only the front surface of the lens substrate may comprise the at least one ring-shaped focusing structure a) in form of at least one recess, b) in form of at least one protrusion or c) in form of at least one recess and at least one protrusion. In case the front surface of the lens substrate and the back surface of the lens substrate are each comprising at least one protrusion, the dimensions of the at least one protrusion on the front surface and the dimensions of the at least one protrusion on the back surface, may be identical to or different from each other. In case the front surface of the lens substrate and the back surface of the lens substrate are each comprising at least one recess, the dimensions of the at least one recess on the front surface and the dimensions of the at least one recess on the back surface, may be identical to or different from each other. In case the front surface of the lens substrate and the back surface of the lens substrate are each comprising at least one ring-shaped focusing structure, the form of the at least one ring-shaped focusing structure on the front surface and the form of the at least one ring-shaped focusing structure on the back surface, typically each with respect of the at least one ring-shaped focusing structure being formed as at least one recess and/or at least one protrusion, may be identical to or different from each other.

The surface of the lens substrate comprising the at least one protrusion provides in a domain of the at least one protrusion an additional power with respect to the surface outside the domain of the protrusion.

The surface of the lens substrate comprising the at least one recess provides in a domain of the lens substrate comprising the at least one recess a difference in surface power with respect to the surface outside the domain of the recess.

The surface of the lens substrate comprising the at least one ring-shaped focusing structure in form of the at least one recess provides due to the at least one recess to the surface of the lens substrate either at least one ring-shaped focal line or a plurality of foci along a ring-shaped line. The plurality of foci may be equidistantly arranged and typically mainly be line-shaped or point-shaped. The surface of the lens substrate comprising the at least one ring-shaped focusing structure in form of the at least one protrusion provides due to the at least one protrusion to the surface of the lens substrate either at least one ring-shaped focal line or a plurality of foci along a ring-shaped line. The plurality of foci may be equidistantly arranged and typically mainly be line-shaped or point-shaped. The plurality of foci may be caused by a plurality of lenslets adjoining each other such that they form a ring of contiguously connected lenslets.

The surface of the lens substrate comprising the at least one ring-shaped focusing structure in form of the at least one recess and in form of the at least one protrusion may form the at least one recess and the at least one protrusion within the same ring-shaped focusing structure. Alternatively, the surface of the lens substrate comprising more ring-shaped focusing structures in form of the at least one recess and in form of the at least one protrusion may form the at least one recess in one ring-shaped focusing structure and the at least one protrusion in another ring-shaped focusing structure. Further alternatively, the surface of the lens substrate comprising more ring-shaped focusing structures in form of the at least one recess and in form of the at least one protrusion may form the at least one recess and the at least one protrusion in one ring-shaped focusing structure, and additionally may form the at least one protrusion in another ring-shaped focusing structure and/or the at least one recess again in another ring-shaped focusing structure. For the at least one recess and the at least one protrusion being formed within the same ring-shaped focusing structure, the at least one recess and the at least one protrusion each provides to the surface of the lens substrate either a ring-shaped focal line or a plurality of foci along a ring-shaped line. For the at least one recess being formed within the same ring-shaped focusing structure, the at least one recess provides either at least one focal line or a plurality of foci along a ring-shaped line to the surface of the lens substrate. For the at least one protrusion being formed within the same ring-shaped focusing structure, the at least one protrusion provides either at least one focal line or a plurality of foci along a ring-shaped line to the surface of the lens substrate. The plurality of foci may be equidistantly arranged and typically mainly be line-shaped or point-shaped. The plurality of foci may be caused by a plurality of lenslets protruding the surface of the lens substrate and adjoining each other to form a ring of contiguously connected lenslets.

The surface of the lens substrate comprising the at least one recess comprises at least one coating composition. The surface of the lens substrate comprising the at least one protrusion comprises at least one coating composition. The surface of the lens substrate comprising the at least one ring-shaped focusing structure in form of the at least one recess and/or in form of the at least one protrusion typically comprises at least one coating composition. The coating composition being next and directly adjacent to the surface of the lens substrate comprising the at least one recess or the at least one ring-shaped focusing structure in form of at least one recess typically fills at least the at least one recess, typically after the coating composition being cured, to obtain, typically by the resulting coating, the surface topography the surface of the lens substrate would have had without the at least one recess and thus typically not covering the residual of the surface of the lens substrate, is a first coating composition that fills at least the at least one recess, typically after the first coating composition being cured, to obtain, typically by the resulting first coating, the surface topography the surface of the lens substrate would have had without the at least one recess, thus typically not covering the residual of the surface of the lens substrate, and a second coating composition different to the one filling the at least one recess covers, typically completely, the surface of the lens substrate as well as the filled at least one recess, the second coating composition resulting after cure in a second coating, the first and second coating typically having a difference in their respective refractive index of at least 0.01, or fills the at least one recess and covers, typically completely, the surface of the lens substrate, i.e., the surface obtained by filling the at least one recess to match the surface topography the surface of the lens substrate would have had without the at least one recess, and the residual of the surface of the lens substrate. After cure the coating composition results in a coating.

Further typically, the coating composition being next and directly adjacent to the surface of the lens substrate comprising the at least one recess or the at least one ring-shaped focusing structure in form of at least one recess fills the at least one recess, after cure the resulting coating to match the surface topography of the surrounding lens substrate and completely coats the so obtained surface of the lens substrate.

The at least one recess provides to the surface of the lens substrate comprising the recess a difference in surface power, as mentioned before. The at least one ring-shaped focusing structure in form of the at least one recess provides to the surface of the lens substrate comprising the at least one ring-shaped focusing structure at least one ring-shaped focal line or a plurality of foci along a ring-shaped line.

The coating composition being next and directly adjacent to the surface of the lens substrate comprising the at least one protrusion or the at least one ring-shaped focusing structure in form of at least one protrusion typically covers the surface of the lens substrate without covering the at least one protrusion, covers the at least one protrusion and, typically completely, the residual of the surface of the lens substrate, the covered at least one protrusion remaining visible as at least one covered protrusion on the resulting covered surface of the lens substrate. After cure of the coating composition, the coated at least one protrusion provides in case of said at least one protrusion an additional power to the coated surface of the lens substrate, at least one ring-shaped focusing structure in form of at least one protrusion an additional power to the coated surface of the lens substrate and/or at least one focal line or a plurality of foci along a ring-shaped line to the coated surface of the lens substrate. The plurality of foci may be equidistantly arranged and typically mainly be line-shaped or point-shaped. The plurality of foci may be caused by a plurality of coated lenslets adjoining each other such that they form a ring of contiguously connected coated lenslets, or covers the at least one protrusion and, typically completely, covers the residual of the surface of the lens substrate, so that, after cure of the coating composition, the minimum thickness of the coating is greater than or equal to the maximum height of the at least one protrusion. The maximum height is the maximum dimension of a protrusion perpendicular to an imagined base surface of a lens substrate, the imagined base surface corresponds to the surface the lens substrate would have had without protrusion. Due to a difference in refractive index of at least 0.01 between the at least one protrusion and the coating surrounding and overcoating the at least one protrusion, the at least one protrusion provides an additional power to the surface of the lens substrate comprising the protrusion, at least one ring-shaped focal line or a plurality of foci along a ring-shaped line to the surface of the lens substrate, in case of the ring-shaped focusing structure. The plurality of foci may be equidistantly arranged and typically mainly be line-shaped or point-shaped. The plurality of foci may be caused by a plurality of lenslets adjoining each other such that they form a ring of contiguously connected lenslets.

Further typically, the coating composition being next and directly adjacent to the surface of the lens substrate comprising the at least one protrusion or the at least one ring-shaped focusing structure in form of at least one protrusion covers the at least one protrusion, thus completely covering the surface of the lens substrate including the at least one protrusion. After cure, the resulting surface topography of the resulting coating is essentially the same as of the surface of the lens substrate without the at least one protrusion.

The lens substrate comprising at least one recess or at least one protrusion typically is manufactured by methods selected from:

Injection molding process with the thermoplastic material; for instance: polycarbonate, polyamide, polyolefins, polyethylene terephthalate, COP, COC material injected with an injection molding process, the injection mold has the recesses or protrusion structure.

Casting process with thermosetting material; for instance: polythiourethane resin having a refractive index of 1.60 (MR8), or a polythiourethane resin having a refractive index of 1.67 (MR7,MR10), or allyl-diglycol-carbonate resin have a refractive index of 1.499. A mold assembly is made by two glass molds or plastic molds, the mold has the recesses or protrusion structure; a gasket to hold the molds to create a cavity; fill in the resin into the cavity and apply thermal cure. Then detach the lens from the mold assembly.

Laser engraving on a lens substrate to fabricate the recesses or protrusion.

Single point diamond tuning on a lens substrate to fabricate the recesses or protrusion.

The coated lens typically comprises a coating, the coating being based on a composition as described before. Before cure, the coating composition is formed or structured, as described in detail below, to obtain a stamping. After cure, the coating composition results in a coating comprising the stamping. Typically, at least the surface of the coating composition facing away from the surface of the lens substrate comprising the coating composition is formed or structured to comprise the stamping before cure. Cure transfers the coating composition in the coating. Typically, at least the surface of the coating facing away from the surface of the lens substrate comprising the coating remains formed or structured to comprise the stamping after cure. The stamping has been described before. After cure, the coating comprising the stamping typically is characterized by at least one feature selected from the group consisting of:

Typically the coating has a thickness within a range of from 5 µm to 100 µm, further typically from 10 µm to 90 µm, more typically from 15 µm to 80 µm and most typically from 20 µm to 60 µm. The thickness of the coating is determined by a chromatic confocal thickness measurement device, typically the measurement device CHRocodile DPS, company PRECITEC.

Typically the coating has an indentation hardness within a range of from 50 MPa to 600 MPa, further typically from 100 MPa to 400 MPa, more typically from 150 MPa to 350 MPa and most typically from to 200 MPa to 300 MPa. The indentation hardness of the coating is typically determined with the nanoindentation tester $UNHT^3$, company Anton Paar GmbH.

Typically the coating is durable by various designed tests that simulate extreme wearing conditions, the tests can be cross-cut adhesion, water boiling, QUV and other accelerated weathering tests.

Typically the coating is compatible with different optical materials a lens substrate may be based on, as already described before.

Typically the coating is compatible with various coating composition that may be applied to the coating.

The coating being in a coating sequence of a coated lens next and adjacent to a lens substrate and in between the lens substrate and an additional outermost coating, thereby being compatible with both of them, means that the coating is easily accommodated to or placed into a given coating sequence. Easily accommodated to or placed into typically means that the coating is just added into a given coating sequence without any need of changing the given coating sequence and/or without the need of adapting a directly adjacent coating composition to the coating.

Alternatively to the coating being next to and directly adjacent to the surface of the lens substrate comprising the coating, the coating may be next to but not directly adjacent to the lens substrate. In this alternative, at least one coating is in between the surface of the lens substrate and the coating. Typically, the at least one coating in between is based on a coating composition as described before but having a different refractive index.

The coating typically is not the outermost coating of the coated lens. The coating may optionally be coated with a primer coating. The primer coating typically is based on at least one primer coating composition comprising i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion and/or at least one aqueous aliphatic, cycloaliphatic, aromatic or heteroaromatic polyester dispersion, typically at least one aqueous aliphatic polyurethane dispersion or at least one aqueous aliphatic polyester dispersion and more typically at least one aqueous aliphatic polyurethane dispersion, and ii) at least one solvent, and iii) optionally at least one additive.

The coating typically is coated with a hard coating. The hard coating, according to ISO 13666:2019(E), section 3.18.2, coating on the surface of an organic lens (3.5.2) intended to enhance the abrasion resistance of the surface during normal use, may be selected from at least one of the hard coatings disclosed in U.S. 2005/0171231 A1, U.S. 2009/0189303 A1, U.S. 2002/0111390 A1, and EP 2 578 649 A1. The hard coating typically is either based on i) a hard coating composition comprising A) a) at least one silane derivative of the formula (I) $Si(OR^1)(OR^2)(OR^3)(OR^4)$, wherein $R^1$, $R^2$, $R^3$ and $R^4$, which may be the same or different, are selected from an alkyl, an acyl, an alkyleneacyl, a cycloalkyl, an aryl or an alkylenearyl group, each of which may optionally be substituted, and/or b) at least one hydrolysis product of the at least one silane derivative of the formula (I), and/or c) at least one condensation product of the at least one silane derivative of the formula (I), and/or d) any mixture of the components a) to c) thereof;

B) a) at least one silane derivative of the formula (II) $R^6R^7_{3-n}Si(OR^5)_n$, in which $R^5$ is selected from an alkyl, an acyl, an alkyleneacyl, a cycloalkyl, an aryl or an alkylenearyl group, each of which may optionally be substituted, $R^6$ is an organic radical containing at least one epoxide group, $R^7$ is selected from an alkyl, a cycloalkyl, an aryl or an alkylenearyl group, each of which may optionally be substituted, n is 2 or 3; and/or b) at least one hydrolysis product of the at least one silane derivative of the formula (II), and/or c) at least one condensation product of the at least one silane derivative of the formula (II), and/or d) any mixture of the components a) to c) thereof;

C) at least one colloidal inorganic oxide, hydroxide, oxide hydrate, fluoride and/or oxyfluoride;

D) at least one epoxide compound having at least two epoxide groups; and

E) at least one catalyst system comprising at least one Lewis acid and at least one thermolatent Lewis acid-base adduct;

or ii) a hard coating composition comprising

A) a) at least one silane derivative of the formula (III) $R^1R^2_{3-n}Si(OR^3)_n$, wherein $R^1$ comprises an alkyl group, a cyclo alkyl group, an acyl group, an aryl group or a hetero aryl group, each of which may be substituted, $R^2$ is an organic rest comprising an epoxide group, $R^3$ comprises an alkyl group, a cyclo alkyl group, an aryl group or a hetero aryl group, each of which may be substituted, n=2 or 3, and/or b) at least one hydrolysis product of the silane derivative of the formula (III), and/or c) at least one condensation product of the silane derivative of the formula (III), and/or d) any mixture of components a) to c);

B) at least one colloidal inorganic oxide, hydroxide, oxide hydrate, fluoride and/or oxyfluoride;

C) at least one epoxy component comprising at least two epoxy groups; and

D) at least one catalyst system comprising at least one Lewis acid and at least one thermolatent Lewis base-adduct.

Typically the stamping provides in a domain of the stamping an additional power to a front surface and/or a back surface of a coated lens comprising the additional coating, i.e, typically the hard coating, with respect of the front surface and/or the back surface outside the domain of the stamping, the additional power being within at least one range selected from the following ranges:

the additional power (ADD) is within a range of larger than 6 dioptres and equal to or lower than 12 dioptres;

the additional power (ADD) is within a range of larger than 7 dioptres and equal to or lower than 11 dioptres;

the additional power (ADD) is within a range of larger than 8 dioptres and equal to or lower than 10 dioptres.

Further typically, the stamping provides in a domain of the stamping a surface power to a front surface and/or a back surface of a coated lens comprising the additional coating, i.e., typically the hard coating, which is different to a surface power of the front surface and/or the back surface outside the domain of the stamping, a difference in surface power being within at least one range selected from the following ranges:

the difference in surface power being within a range of larger than 6 dioptres and equal to or lower than 12 dioptres;

the difference in surface power being within a range of larger than 7 dioptres and equal to or lower than 11 dioptres;

the difference in surface power being within a range of larger than 8 dioptres and equal to or lower than 10 dioptres.

Additionally, at least one of an anti-reflective coating an anti-reflective coating and a clean coating, the clean coating being the outermost thereof, an anti-reflective coating and an anti-fog coating, the anti-fog coating being the outermost thereof, may be applied.

The coated lens according to the disclosure comprises core shell coating, the core shell coating comprising a stamping, the stamping as described before. The stamping is having in a domain of the stamping a surface power which is different from a surface power of a lens surface, i.e., a front surface and/or a back surface, of the coated lens comprising the core shell coating outside the domain of the stamping. Typically, a lens substrate, the lens substrate having at least a front surface and a back surface, comprises on at least one of the surfaces at least one core shell coating. The lens substrate comprises on the front surface and/or on the back surface the at least one core shell coating. The core shell coating on the front surface of the lens substrate comprises a surface facing away from the front surface of the lens substrate, at least the surface of the core shell coating comprises a stamping. The core shell coating on the back surface of the lens substrate comprises a surface facing away from the back surface of the lens substrate, at least the surface of the core shell coating comprises a stamping. In a coated lens comprising a lens substrate and the core shell coating, the outermost surface of the shell of the core shell coating is with respect to the surface of the lens substrate comprising the core shell coating, the surface facing away from the surface of the lens substrate. In a coated lens comprising a lens substrate and the core shell coating only, the outermost surface of the shell of the core shell coating is simultaneously the outermost surface of such a coated lens, i.e., the outermost surface of the shell is the outermost surface of the coated lens if the coated lens comprises no further coating on top of the core shell coating. The outermost surface of the shell is with respect to the surface of the lens substrate comprising the core shell coating the surface facing away from the lens substrate, but not necessarily the outermost surface of the coated lens. The outermost surface of the shell is not the outermost surface of a coated lens if the coated lens comprises at least one additional coating on top of the core shell coating, i.e., on top of the surface of the shell facing away from the surface of the lens substrate comprising the core shell coating. Typically at least the front surface of the lens substrate comprises the core shell coating, the core shell coating comprising a surface facing away from the front surface of the lens substrate, the surface comprising a stamping. Further typically, only the front surface of the lens substrate comprises the core shell coating.

The surface of the core shell coating facing away from the surface of the lens substrate comprising the core shell coating typically is formed or structured to comprise the stamping. Typically the shell and the core being directly adjacent to the shell are formed or structured to comprise the stamping.

The shell of the core shell coating typically is not surrounding the core but the shell is at least directly adjacent to the surface of the core facing away from the surface of the lens substrate comprising the core shell coating. The shell of the core shell coating is covering the surface of the core not being next to the surface of the lens substrate comprising the core shell coating. The core of the core shell coating is next to and typically directly adjacent to the surface of the lens substrate comprising the core shell coating. The core next to and directly adjacent to the surface of the lens substrate typically adapts the surface topography of the surface of the lens substrate. Alternatively, the core of the core shell coating is next to but not directly adjacent to the surface of the lens substrate comprising the core shell coating. In this alternative at least one further coating is in between the surface of the lens substrate comprising the core shell coating and the core shell coating itself.

Typically, the surface of the core not being next to the surface of the lens substrate, i.e., the surface of the core facing away from the surface of the lens substrate comprising the core shell coating, comprises the stamping. The shell being next and directly adjacent to the surface of the core comprising the stamping adapts the surface to also comprise the stamping.

The core shell coating may comprise with the stamping one structure that provides a ring-shaped focal line or a plurality of foci along a ring-shaped line to the shell, or more structures that provide a ring-shaped focal line or a plurality of foci along a ring-shaped line to the shell.

The plurality of foci may be equidistantly arranged and typically mainly line-shaped or point-shaped. The plurality of foci typically is caused by a plurality of lenslets adjoining each other to form a ring of contiguously connected lenslets.

The core of the core shell coating typically comprises a coating composition as described before.

The shell of the core shell coating typically comprises a hard coating, for example one the hard coating as described before.

The coated lens comprises a lens substrate as described before.

Typically, the core of the core shell coating provides a stamping, or completely covers recesses or protrusions of a substrate, or both. The geometry of the stamping determines the optimized thickness range of the core. The shell of the core shell coating provides essential protection to the stamping and more importantly, act as a bridge layer between the core of the core shell coating and an adjacent coating, for example anti-reflective coating given the big difference in thermal expansion of them.

In case, the shell of a core shell coating being a hard coating as described before, the core shell coating comprising a thick core and a thin shell tend to have issues of crazing because of different thermal expansion; and vice versa, the core shell coating comprising a thin core and a thick shell limit the capability of realization of stampings, and also tend to have crazing because of the brittleness of the hard coating. Therefor to reduce the risk of crazing, typically the shell of the core shell coating is having a thickness within a range of 0.6 μm to 10 μm, further typically of 1.5 μm to 8 μm, more typically of 2.0 μm to 7 μm and most typically of 3 μm to 6 μm.

The coated lens according to the disclosure comprises a coating and/or an additional coating, the coating and/or the additional coating comprises a stamping, the stamping comprises at least one ring-shaped focusing structure, i.e., one ring-shaped focusing structure or more ring-shaped focusing structures. Typically, the coated lens comprises a lens substrate as described before, the lens substrate having at least a front surface and a back surface. The lens substrate comprises on at least one of the front surface and the back surface, at least one coating. The at least one coating on the front surface of the lens substrate comprises a surface facing away from the front surface, at least the surface comprises a stamping comprising at least one ring-shaped focusing structure. The at least one coating on the back surface of the lens substrate comprises a surface facing away from the back surface, at least the surface comprises a stamping comprising at least one ring-shaped focusing structure. Each of the at least one ring-shaped focusing structures have a respective width, and at least one additional feature selected from the group consisting of:

(i) a central clear zone having a central clear zone width within a range of 6 mm to 9.4 mm and the width being equal to or lower than 0.7 mm;

(ii) the width being lower than 0.5 mm;

(iii) a surface-based fill factor defined as a surface area ratio of a surface area of an innermost ring-shaped focusing structure of more ring-shaped focusing structures and a sum of the surface area of the innermost ring-shaped focusing structure of the more ring-shaped focusing structures and an area of a peripheral clear zone, the surface-based fill factor being within a range of larger than 17% and equal to or lower than 70% for the width of the more ring-shaped focusing structures in a range of 0.6 mm to 0.7 mm;

(iv) a surface-based fill factor defined as a surface area ratio of a surface area of an innermost ring-shaped focusing structure of more ring-shaped focusing structures and a sum of the surface area of the innermost ring-shaped focusing structure of the more ring-shaped focusing structures and an area of a peripheral clear zone, the surface-based fill factor being within a range of larger than 15% and equal to or lower than 60% for the width of the more ring-shaped focusing structures in a range of 0.5 mm to 0.6 mm;

(v) a surface-based fill factor defined as a surface area ratio of a surface area of an innermost ring-shaped focusing structure of more ring-shaped focusing structures and a sum of the surface area of the innermost ring-shaped focusing structure of the more ring-shaped focusing structures and an area of a peripheral clear zone, the surface-based fill factor being within a range of larger than 6% and equal to or lower than 50% for the width of the more ring-shaped focusing structures lower than 0.5 mm.

The definitions and descriptions with respect to "coated lens," "lens substrate," "structure," "ring-shaped focusing structure" given before shall apply.

The term "width of a ring-shaped focusing structure" designates an expansion of a ring-shaped focusing structure along a direction perpendicular to its circumferential direction as measured from its inner and outer onsets. The term "onset" represents a first measurable position of a ring-shaped focusing structure on a surface of a coated lens. In other words, the term "onset" represents the position on the surface of the coated lens in which a surface shape, form or topography of the ring-shaped focusing structure starts to deviate from a shape, form or topography of the surface of the coated lens, the surface of the coated lens comprising the ring-shaped focusing structure, along the direction of the width; or, in case the surface of the coated lens comprising the ring-shaped focusing structure assumed to be of a same surface shape, form or topography as a surface of a lens substrate, the term "onset" represents a position on the surface of the coated lens in which a surface shape, form or topography of the ring-shaped focusing structure starts to deviate from a shape, form or topography of the surface of the lens substrate. Further, the term "inner onset" specifies an onset on the side of the ring-shaped focusing structure towards a center of the coated lens and the term "outer onset" specifies an onset of the ring-shaped focusing structure away from the center of the coated lens towards a periphery.

In the context of the present disclosure, the term "clear zone" applies to a structure-free zone of a coated lens. It is designed such that it shall neither provide a myopic defocus nor a diffusion in foveal vision when a wearer looks through the clear zone with the coated lens being positioned according a specified as-worn position. Furthermore, a clear zone may allow for achieving, if required assisted by accommodation, a focused image on the fovea.

A "central clear zone" is a structure-free zone which is neighbored and surrounded by a ring-shaped focusing structure.

The optical center (ISO 13666:2019(E), section 3.2.15) of a single-vision coated lens in general typically is located within the central clear zone. Progressive-power coated spectacle lenses may comprise more than one, in particular two central clear zones located e.g., in near portion (ISO 13666:2019, section 3.15.3) and distance portion (ISO 13666:2019, section 3.15.1).

A "central clear zone width" is a maximum expansion of a domain of a central clear zone on a lens surface of a coated lens, i.e., a front surface or a back surface thereof, limited by two inner onsets of an innermost ring-shaped focusing structure in opposite tangential directions. Alternatively, a central clear zone width is a maximum expansion of a domain of a central clear zone on a lens surface of coated lens, limited by two inner onsets of an innermost ring-shaped focusing structure along each line through an optical centre or a fitting point of a coated lens. A fitting point of a coated lens is defined analogously as in ISO 13666:2019(E), section 3.2.34, as a point of the front surface of a coated lens stipulated by the manufacturer for positioning the coated lens in front of the eye.

A central clear zone with a central clear zone width within a range of 6 mm to 9.4 mm has the advantage that a small clear zone e.g., 6 mm increases the probable efficacy of the coated lens for a reduction of progression of myopia for a wearer. At the same time the small clear zone decreases the acceptance of the coated lens by the wearer due to the decreased comfort of wearability of the coated lens. A large clear zone, e.g., 9.4 mm decreases the probable efficacy of the coated lens for the reduction of progression of myopia for the wearer. At the same time the large clear zone increases the acceptance of the coated lens by the wearer due to the increased comfort of wearability of the coated lens.

The term "fill factor" must be subdivided into "length-based fill factor" and "surface-based fill factor." The length-based fill factor is used for determining the fill factor of a circular-shaped focusing structure, whereas the surface-based fill factor is used for determining the fill factor of a ring-shaped focusing structure.

The length-based fill factor is defined as the ratio of the width of the inner circular-shaped focusing structure adjacent to a clear zone ("width") and the radial distance between the inner circular-shaped focusing structure and the neighboring circular-shaped focusing structure ("pitch"):

$$\text{length based fill factor} = \frac{\text{width}}{\text{pitch}}$$

A "pitch" is a distance between an onset of two neighboring circular-shaped focusing structures.

The length-based fill-factor has the advantage to define the balance between the wearability and the manufacturing of the inventive coated lens comprising circular-shaped focusing structures. A length-based fill factor greater than 60% results in a decrease of comfortable wearability of the coated lens but increases the probable efficacy of the coated lens for the reduction of progression of myopia for the wearer. A length-based fill factor smaller than 40% results in a decrease of the probable efficacy of the coated lens for the reduction of progression of myopia for the wearer but increases the comfortable wearability of the coated lens. In other words, a well-defined balance between the wearability and the manufacturing of the inventive coated lens is achieved with a length-based fill factor in the range of 40% to 60%. In particular, a length-based fill factor of 50% is typical.

The "surface-based fill factor" is determined by a surface area ratio of a surface area of the innermost ring-shaped focusing structure of more ring-shaped focusing structures and a sum of the surface area of the innermost ring-shaped focusing structure and a surface area of a peripheral clear zone. The term "innermost" describes the closest ring-shaped focusing structure to the central clear zone. The term "peripheral clear zone" refers to the first clear zone next to central clear zone. In case a lens surface of a coated lens, i.e., a front surface and/or a back surface thereof, comprises one ring-shaped focusing structure, a peripheral clear zone is additionally to a central clear zone a further domain on a respective lens surface not comprising one or more ring-shaped focusing structure(s). The one ring-shaped focusing structure is separating the central clear zone from the peripheral clear zone. In case the lens surface of the coated lens comprises the one ring-shapes focusing structure the peripheral zone expands from an outer onset line of the ring-shaped focusing structure to an edge of the lens surface. The outer onset line passes along each outer onset of the one ring-shaped focusing structure, the outer onset line is thereby surrounded or encircled by the peripheral clear zone. In this context shall be understood that an inner onset line is an onset line that typically is closer to a central clear zone and an outer onset line typically is further away from the central clear zone.

In case a lens surface of a coated lens, i.e., a front surface or a back surface thereof, comprises more ring-shaped focusing structures, a peripheral clear zone is additionally to a central clear zone a further domain on a respective lens surface not comprising one or more ring-shaped focusing structure(s). In this case, the peripheral clear zone is the further domain not comprising one or more ring-shaped focusing structure(s) closest to a central clear zone and separated from the central clear zone by an innermost ring-shaped focusing structure of the more ring-shaped focusing structures. In case the lens surface of the coated lens comprises the more ring-shaped focusing structures the peripheral clear zone expands from an outer onset line of the innermost ring-shaped focusing structure to an inner onset line of a closest neighboring ring-shaped focusing structure of the more ring-shaped focusing structures. The outer onset line passes along each outer onset of the innermost ring-shaped focusing structure and is thereby surrounded by the peripheral clear zone. The inner onset line passes along each inner onset of the closest neighboring ring-shaped focusing structure, the inner onset line is thereby limiting an expansion of the peripheral zone.

The surface area of an innermost ring-shaped focusing structure is determined by an inner onset line and an outer onset line of the innermost ring-shaped focusing structure. The inner onset line passes along each inner onset of the innermost ring-shaped focusing structure, the inner onset line is thereby surrounding or encircling a central clear zone. The outer onset line passes along each outer onset of the innermost ring-shaped focusing structure, the outer onset line is thereby surrounded or encircled by a peripheral clear zone. The inner onset line and the outer onset line of the innermost ring-shaped focusing structure are enclosing a surface area along a lens surface, i.e., a front surface or a back surface, of a coated lens without structure(s), the surface area is the surface area of the innermost ring-shaped focusing structure.

In case a lens surface of a coated lens, i.e., a front surface and/or a back surface thereof, comprises more ring-shaped focusing structures, the surface area of the peripheral clear zone is determined by an outer onset line of the innermost ring-shaped focusing structure and an inner onset line of a closest neighboring ring-shaped focusing structure. The inner onset line of the closest neighboring ring-shaped focusing structure passes along each inner onset of the closest neighboring ring-shaped focusing structure, the inner onset line thereby surrounding or encircling the peripheral clear zone.

The outer onset line of the innermost ring-shaped focusing structure and the inner onset line of the closest neighboring at least one ring-shaped focusing structure are enclosing a surface area along a surface of the coated lens comprising the more ring-shaped focusing structures, the surface area is the surface area of the peripheral clear zone.

The surface-based fill-factor has the advantage to define a balance between wearability and manufacturing of a coated lens comprising more ring-shaped focusing structures. A surface-based fill factor greater than 59.2% results in a decrease of comfortable wearability of the coated lens but increases the probable efficacy of the coated lens for the reduction of progression of myopia for the wearer. A surface-based fill factor smaller than 56.1% results in a decrease of the probable efficacy of the coated lens for the reduction of progression of myopia for the wearer but increases the comfortable wearability of the coated lens. In other words, a well-defined balance between the wearability and the manufacturing of the inventive coated lens is achieved with a surface-based fill factor in the range of 34.6-59.2%. In particular, a surface-based fill factor of 46.4 to 47.7% is typical.

Typically the stamping of the coating is further wherein the width(s) of the at least one ring-shaped focusing structure is within at least one range selected from the following group of ranges:
- (i) the width is larger than 0.2 mm and equal or lower than 0.7 mm;
- (ii) the width is larger than 0.3 mm and equal or lower than 0.7 mm;
- (iii) the width is equal or lower than 0.6 mm;
- (iv) the width is larger than 0.2 mm and equal or lower than 0.6 mm;
- (v) the width is larger than 0.3 mm and equal or lower than 0.6 mm;
- (vi) the width is equal or lower than 0.5 mm;
- (vii) the width is larger than 0.2 mm and equal or lower than 0.5 mm;
- (viii) the width is larger than 0.3 mm and equal or lower than 0.5 mm.

The advantage consists in a well-defined balance between the wearability and the manufacturing of the coated lens. A decrease of the width of a ring-shaped focusing structure leads to a more comfortable wearability of the coated lens. An increase of the width of a ring-shaped focusing structure enables easier manufacturing of the coated lens.

Typically the coated lens is further characterized in having a central clear zone width within at least one range selected from the following group of ranges:
- (i) the central clear zone width is larger than 6 mm and lower or equal than 7 mm;
- (ii) the central clear zone width is larger than 7 mm and lower or equal than 9.4 mm.

A central clear zone with a central clear zone width within a range of 6 mm to 7 mm has the advantage that a small clear zone, e.g., 6 mm increases the probable efficacy of the coated lens for the reduction of progression of myopia for the wearer. At the same time the small clear zone decreases the acceptance of the coated lens by the wearer due to the decreased comfort of wearability of the coated lens. A central clear zone with a central clear zone width within a range of 7 mm to 9.4 mm has the advantage that a large clear zone, e.g., 9.4 mm increases the acceptance of the coated lens by the wearer due to the increased comfort of wearability of the coated lens.

Typically the coated lens is wherein the at least one ring-shaped focusing structure provide an additional power as compared to the central clear zone within at least one range selected from the following group of ranges:
- (i) the additional power is larger than 6 diopter and equal or lower than 12 diopter;
- (ii) the additional power is larger than 7 diopter and equal or lower than 11 diopter;
- (iii) the additional power is larger than 8 diopter and equal or lower than 10 diopter.

In the context of the present specification, the term "additional power" applies to a focal power that is added to the focal power of a coated lens in at least one meridian, where the focal power of a coated lens provides, assisted by accommodation, a focused image on the fovea and the additional power, when added to the focal power of a coated lens, provides for a myopic defocus. The additional power must not be confused with the addition power of a progressive addition lens.

The term "focal power" is a collective term for the spherical vertex power, which brings a paraxial pencil of parallel light to a single focus (and which is usually considered in the prescription by the "sphere" value or, abbreviated, "sph," and the cylindrical vertex power of a spectacle lens, which brings a paraxial pencil of parallel light to two separate line foci mutually at right angles (ISO 13666:2019 (E), section 3.10.2) and which is usually considered in the prescription by the "cylinder" value or, abbreviated, "cyl."

The advantage of this further exemplary embodiment is to define the balance between the wearability and the manufacturing of the coated lens. An additional power between 10 and 12 diopter increases the probable efficacy of the coated lens for the reduction of progression of myopia for the wearer. An additional power between 6 and 8 diopter increases the comfortable wearability of the coated lens. In other words, a well-defined balance between the wearability and the manufacturing of the coated lens is achieved with an additional power in the range of 6 diopter to 8 diopter. In particular an additional power of 10 diopter is typical.

A coated lens described before may be available in physical reality or as a digital twin of a coated lens, the digital twin of the coated lens being for the purpose of a use of the digital twin for a manufacture of the coated lens. The digital twin of a coated lens shall be defined analogously as in ISO 13666:2019(E), section 3.18.1 (coated lens), as a digital twin of a spectacle lens to which one or more surface layers have been added digitally to alter one or more properties of the digital twin of the spectacle lens. The digital twin of the coated lens is for the purpose of a use of the digital twin for manufacturing the coated lens. The digital twin of the coated lens is a mathematical description of a lens surface of a front surface of the coated lens, a mathematical description of a lens surface of a back surface of the coated lens, the mathematical descriptions including a relative orientation of the lens surface of the front surface to the lens surface of the back surface and a refractive index of a digital twin of a lens substrate.

The digital twin of the coated lens being for the purpose of a use for manufacturing the coated lens may be stored on a computer-readable data carrier or transformed into a data carrier signal.

The coated lens according to the present disclosure may be in the form of computer-readable instructions for the production thereof stored on a computer-readable data carrier.

The coated lens being designed according to the inventive principle described before may also be realized in the form of computer-readable data stored on a computer-readable data carrier.

The coated lens according to the present disclosure may be in the form of computer-readable instructions for the production thereof transformed into a data carrier signal.

The coated lens being designed according to the inventive principle described before may also be realized in the form of a data carrier signal.

The coated lens according to the present disclosure may be in the form of a numerical data set.

The coated lens according to the present disclosure may be in the form of a data signal transferring a numerical data set.

The coated lens according to the present disclosure may be in the form of a data carrier storing a numerical data set.

According to the disclosure, a method for manufacturing a coated lens comprises at least the following step of
    stamping a coating composition.

The coating composition is a coating composition as described in detail before. The stamping, typically the structure obtained by stamping the coating composition in form of at least one protrusion and/or at least one recess has been described before.

The method for manufacturing the coated lens is characterized in a step of
    stamping a coating composition such that a surface power in a domain of a stamping is different from a surface power of a lens surface comprising the coating composition outside the domain of the stamping.

Stamping the coating composition has at least one of the following advantages compared to WO 2020/078964 A1, on which the disclosure is based:
    No bubble and curing issues during curing in contrast to WO 2020/078964 A1. All hard coating compositions cited in WO 2020/078964 A1 are solvent based hard coating compositions, stamping such hard coating compositions results in issues like slow speed of curing and bubbles because of the unescapable solvent constrained by the laminated lens substrate and stamp,
    No limitation on geometry of stamping structure of the coating composition in contrast to WO 2020/078964 A1. Stamping a hard coating has a limitation on the compressibility thereof (normally <10% for volume, means <3% for thickness, C. E. Weir, Journal of Research of the National Bureau of Standards, Vol. 46, No. 3, March 1951, page 207-212; R. W. Warfield, Compressibility of Bulk Polymers, Polymer Engineering and Science, Volume 6 (2)—Apr. 1, 1966, page 176-180),
    No temporarily stamping of the coating composition in contrast to WO 2020/078964 A1. Stamping a hard coating under high temperature and pressure will be only temporally as crosslinked coating composition will tend to recover its original shape given the elastic nature,
    No deformation of a lens substrate, even when based on a plastic material, in contrast to WO 2020/078964 A1. Stamping a hard coating under high temperature and pressure will not allow for selectively stamping the hard coating without deforming a lens substrate based on a plastic material.
    No crazing of the coating composition and after cure in the resulting coating in contrast to WO 2020/078964 A1. Stamping with high deformation, high temperature and high pressure a brittle hard coating results in crazing of the hard coating.

Stamping a coating composition shall mean that in contrast to U.S. 2021/0263194 A1 a coating composition is already applied to a lens surface of a lens substrate, i.e., a front surface and/or a back surface thereof and then stamped and transferred via a stamp to a lens surface. As described below, at least one of a coating composition or a coating may be transferred via a stamp to an already existing coating composition of a lens surface of a lens substrate, i.e., to an already present coating composition on a front surface and/or a back surface thereof, while simultaneously stamping the already the already existing coating composition. Thus, in contrast to U.S. 2021/0263194 A1, both the transferred coating composition and the already present coating composition or both the transferred coating and the already present coating composition comprise a stamping and not only the transferred coating composition or the transferred coating.

Typically, a stamping provides in a domain of the stamping a surface power to a lens surface, i.e., a front surface and/or a back surface of a coated lens, comprising the stamping which is different to a surface power of the lens surface outside the domain of the stamping. Typically, a difference in surface power being within at least one range selected from the following ranges:

the difference in surface power is within a range of larger than 3 dioptres and equal to or lower than 14 dioptres;

the difference in surface power is within a range of larger than 5 dioptres and equal to or lower than 13 dioptres;

the difference in surface power is within a range of larger than 6 dioptres and equal to or lower than 12 dioptres.

Typically, the stamping provides, after cure of the coating composition resulting in a coating, an additional power to the coating, the additional power being within at least one range selected from the following ranges:

the additional power (ADD) is within a range of larger than 3 dioptres and equal to or lower than 14 dioptres;

the additional power (ADD) is within a range of larger than 5 dioptres and equal to or lower than 13 dioptres;

the additional power (ADD) is within a range of larger than 6 dioptres and equal to or lower than 12 dioptres.

Typically, in a domain of a stamping a surface power is different to a surface power of a lens surface comprising an additional coating outside the domain of the stamping, a difference in surface power typically is within at least one range selected from the following ranges:

the difference in surface power is within a range of larger than 6 dioptres and equal to or lower than 12 dioptres;

the difference in surface power is within a range of larger than 7 dioptres and equal to or lower than 11 dioptres;

the difference in surface power is within a range of larger than 8 dioptres and equal to or lower than 10 dioptres.

Typically, an additional coating composition is applied to the coating, the additional coating composition being an outermost coating composition and being selected from the group consisting of a hard coating composition, the coating composition, typically having difference in refractive index of at least 0.01 to the coating the coating composition and a hard coating composition, the hard coating composition being the outermost thereof.

Applying an additional coating composition, for example a hard coating composition resulting after cure in a hard coating, has the advantage of having an outermost coating for the protection of the coating, and at least one of an anti-reflective coating an anti-reflective coating and an anti-fog coating, the anti-fog coating being the outermost thereof, an anti-reflective coating and a clean coating, the clean coating being the outermost thereof may be applied to obtain a coated lens of high quality.

Typically, the additional coating adapts to the coating.

Typically, the stamping provides an additional power to the additional coating, the additional power being within at least one range selected from the following ranges:

the additional power (ADD) is within a range of larger than 6 dioptres and equal to or lower than 12 dioptres;

the additional power (ADD) is within a range of larger than 7 dioptres and equal to or lower than 11 dioptres;

the additional power (ADD) is within a range of larger than 8 dioptres and equal to or lower than 10 dioptres.

Typically, the method comprises at least the following steps in the given order:

(a) applying a coating composition to at least one of
a front surface of the lens substrate,
a back surface of the lens substrate, (b) applying a surface of a stamp to at least one of
the front surface comprising the coating composition, and
the back surface comprising the coating composition,
thereby stamping the coating composition between at least one of
the front surface and the surface of the stamp, and
the back surface and the surface of the stamp,
or (a') applying a coating composition to a surface of a stamp, (b') applying at least one of a front surface of the lens substrate and a back surface of the lens substrate to the surface of the stamp comprising the coating composition,
thereby stamping the coating composition between at least one of
the front surface and the surface of the stamp,
the back surface and the surface of the stamp, (c), (c') precuring the coating composition resulting in a precured coating, (d), (d') removing the stamp from the precured coating, (e), (e') curing the precured coating resulting in a coating,
the coating comprising a stamping.

The thickness of the coating can be influenced by:

a) the geometry of the stamping b) the viscosity of the coating composition c) the total load (weight of stamp/lens and extra press force) and the time d) the difference in surface curvature between the lens substrate and the stamp.

The surface area to be covered by the coating composition is influenced by:

a) the volume of coating composition b) the total load and the time c) the viscosity of the coating composition d) the base curve of the surface, the steeper the more difficult to cover large area.

From process point of view, once the geometry of the stamping is determined, the next is to define an optimized coating thickness, and playing with "viscosity," "weight load and time," "volume of coating composition" to achieve it.

The stamp or at least the surface of the stamp being structured or formed to provide a stamping to an adjacent surface of a coating typically is based on a material of high thermal stability, high UV durability and high transparency. The surface of the stamp should present characteristics of low water uptake, solvent resistance and low chemical reactivity for easy removal of the stamp from the adjacent surface of the coating composition the previously. The stamp can be any type of material that can be formed with a low surface roughness (Ra<1 μm), typically the stamp is a kind of plastic that is optically transparent.

The stamp component can be either thermoset or thermoplastic, for thermoset typically the stamp is produced by a casting and molding process, for thermoplastic typically the stamp is produced by an injection molding process.

For a stamp that provides a stamping, the structure of the stamping can be created from the casting or injection process from the molds. Or separately by an additional process, i.e., laser engraving and single-point diamond machining.

The stamp produced from above process is typically has no residual chemical functional groups like $C{=}C$, $-COOH$, $-OH$, $-CONH_2$, $-SH$, $-CO-$, $-COH$, $-SO_3H$, $-NH_2$.

The stamp is typically having a water uptake in a range from 0 to 0.5%, more typically in a range from 0 to 0.1%, mostly typically in a range from 0% to 0.01%.

The stamp typically has a high transmission in the UV wavelength described previously, more typically having a transmission higher than 50%, most typically higher than 80%.

For example, the stamp or at least the surface of the stamp being structured or formed may be based cyclic block copolymers such as commercially available as ViviOn (CBC), company USI Corporation.

According to the disclosure, a method for manufacturing a coated lens comprises at least the following step of stamping a first coating composition, thereby transferring at least one of a second coating composition and a second coating to the first coating composition.

The method for manufacturing a coated lens is characterized in a step of stamping a first coating composition, thereby transferring at least one of a second coating composition and a second coating to the first coating composition, such as in a domain of a stamping a surface power is different from a surface power of a lens surface comprising the first coating composition and at least one of the second coating composition and the second coating outside the domain of the stamping.

Typically, a difference in surface power is selected from at least one range of the following group of ranges:

the difference in surface power is within a range of larger than 6 dioptres and equal to or lower than 12 dioptres;

the difference in surface power is within a range of larger than 7 dioptres and equal to or lower than 11 dioptres;

the difference in surface power is within a range of larger than 8 dioptres and equal to or lower than 10 dioptres.

The method for manufacturing a coated lens is characterized in a step of stamping a first coating composition, thereby transferring at least one of a second coating composition and a second coating to the first coating composition, such as a stamping comprises one ring-shaped structure or more ring-shaped structures.

Domain, surface power, and ring-shaped structure typically as described before.

With respect to the first coating composition the before given description with respect to a coating composition shall apply. With respect to the method stamping and the resulting stamping of a coating composition the before mentioned shall apply. The second coating typically is a hard coating.

Typically, in that in a domain of a stamping the stamping provides a surface power to a lens surface, i.e., a front surface and/or a back surface of a coated lens, comprising the second coating, typically a hard coating, which is different to a surface power of the lens surface outside the domain of the stamping, a difference in surface power typically being within at least one range selected from the following ranges:

the difference in surface power is within a range of larger than 6 dioptres and equal to or lower than 12 dioptres;

the difference in surface power is within a range of larger than 7 dioptres and equal to or lower than 11 dioptres;

the difference in surface power is within a range of larger than 8 dioptres and equal to or lower than 10 dioptres.

As mentioned before at least one of an anti-reflective coating an anti-reflective coating and an anti-fog coating, the anti-fog coating being the outermost thereof, an anti-reflective coating and a clean coating, the clean coating being the outermost thereof, may be further applied or deposited thereon.

Typically, the method comprising at least the following steps:

(a) applying the first coating composition on at least of a front surface of the lens substrate, a back surface of the lens substrate, (b) applying a stamp comprising another coating on at least one of the front surface comprising the first coating composition, the back surface comprising the first coating composition, thereby stamping the coating composition and transferring the other coating to the coating composition, or (a') applying the first coating composition on a surface of a stamp, the surface of the stamp comprising another coating, (b') applying at least one of a front surface of the lens substrate and a back surface of the lens substrate to the surface of the stamp comprising the second coating composition or the second coating, thereby stamping the coating composition and transferring the second coating composition or the second coating to the first coating composition, (c)(c') curing the first and second coating compositions resulting in a first and second coating, (d)(d') removing the stamp from the second coating.

DESCRIPTION OF EXEMPLARY EMBODIMENTS

Figure 1:
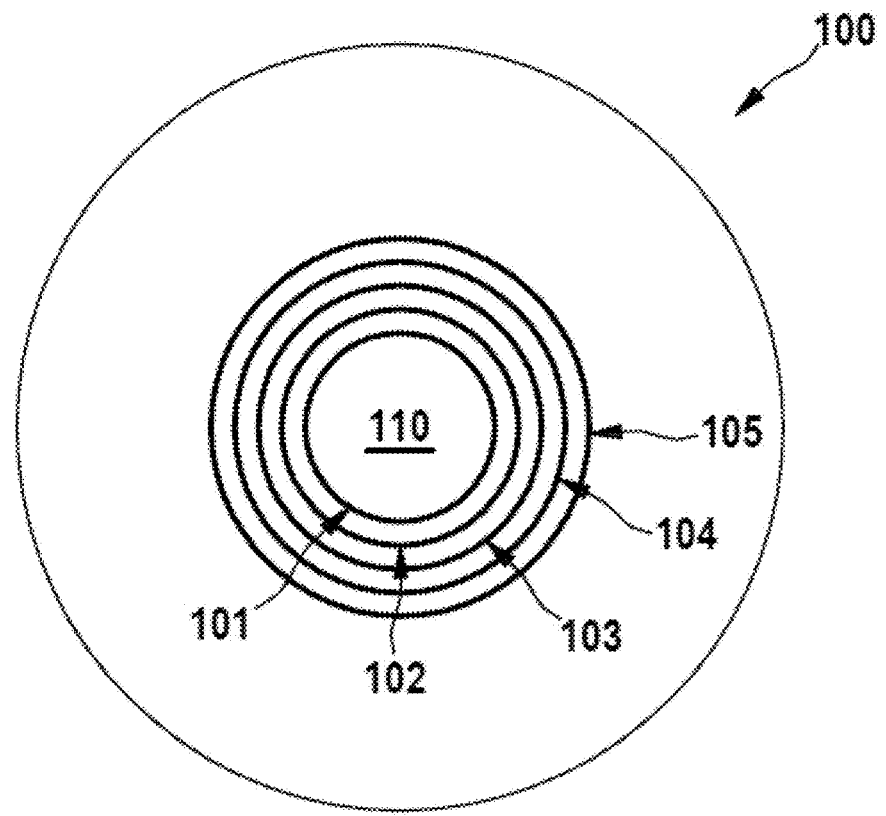
FIG. 1 shows a single vision coated lens according to an exemplary embodiment of the present disclosure with a plurality of ring-shaped focusing structures.
Figure 2:
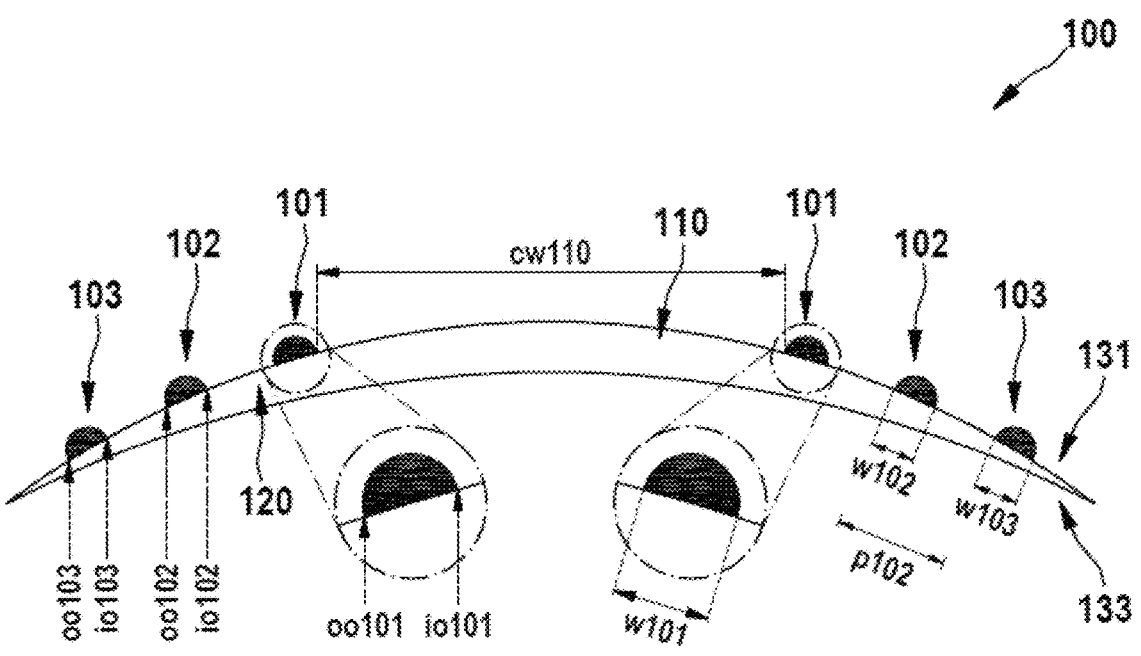
FIG. 2 shows a cross-sectional view of the single vision coated lens according to FIG. 1 to demonstrate how to determine the width of a ring-shaped focusing structure, the pitch of two neighboring ring-shaped focusing structures and the central clear zone width.
Figure 3:
FIG. 3 shows a cross section of a cross section of a coated lens according to example 19 of the present disclosure, with 1 being a lens substrate, 2 being a coating based on a coating composition comprising an epoxide component and an acrylate component, 3 being a hard coating, the anti-reflective coating and the clean coating not shown.

An exemplary embodiment of the present disclosure is described with respect to FIG. 1 and FIG. 2, which show a single vision coated lens 100. The single vision coated lens 100 comprises a central clear zone 110. The central clear zone 110 in this exemplary embodiment has a focal power being designed for the correction of an existing myopia of the wearer. In the present exemplary embodiment, the single vision coated lens 100 comprises additionally five circular-shaped focusing structures 101 to 105 of equal cross-section. Circular-shaped means ring-shaped with a circular contour in front view.

The circular-shaped focusing structures 101 to 105 are formed such that an additional focal power of 12 diopters is provided as compared to the focal power of the central clear zone 110. This additional focal power is recognized by the wearer as blur and is demonstrated, e.g., in X. Li, C. Ding, Y. Li, E. W: Lim, Y. Gao, B. Fermigier, A. Yang, C. Chen, J. Bao, Influence of Lenslet Configuration on Short-Term Visual Performance in Myopia Control Spectacle Lenses, Front. Neurosci. 2021, 15:667329, doi: 10.3389/ fnins.2021.667329. This additional focal power leads to a reduction of progression of myopia of the wearer.

The single vision coated lens 100 shown in FIGS. 1 and 2 has a diameter of 7 cm. Therefore, the coated lens 100 of FIG. 1 requires an edging process to be fitted into a respective spectacle frame. The single vision coated lens 100 comprises five circular-shaped focusing structures 101 to 105. The circular-shaped focusing structures 101 to 105 are concentrically arranged towards the optical center of the single vision coated lens 100. Moreover, the circular-shaped focusing structure 101 is surrounding the central clear zone 110 having a circular central clear zone width cw110 of 7.0 mm. The width w101 of the circular-shaped focusing structure 101 is 0.5 mm. The neighboring circular-shaped structure 102 is arranged concentrically to the inner circular-shaped structure 101, encircling the circular central clear zone 110, with a pitch p101 of 1.0 mm. The ratio of the width w101 and the pitch p101 results in a length-based fill factor of 50.0% and a surface-based fill factor of 46.9%.

FIG. 2 shows a cross-sectional view of the single vision coated lens 100. The front surface 131 being the outermost surface of the coating and the front surface 133 of the lens substrate of the single vision coated lens 100 are spherically shaped. Within the scope of this disclosure the shape of the front surface 131 and the front surface 133 of the single vision coated lens 100 are not limited to a spherical shape, it also can be of aspherical, toroidal, atoroidal or even be freely formed in order to comply with wearer's individual needs.

FIG. 2 demonstrates how to determine the inner onset io101 of a circular-shaped focusing structure 101 and the outer onset oo101 of a circular-shaped focusing structure 101, the width of a circular-shaped focusing structure w101 to w103, the pitch of two neighboring circular-shaped focusing structures p101 and the central clear zone width cw110. For simplicity reasons only the three circular-shaped focusing structures 101 to 103 are shown in FIG. 2 compared to the five circular-shaped focusing structures 101 to 105 shown in FIG. 1.

The determination of an inner onset and an outer onset of a circular-shaped focusing structure is explained exemplary for the circular-shaped focusing structure 101. The inner onset io101 of the circular-shaped focusing structure 101 is a point directly adjacent to the central clear zone 110. The outer onset oo101 of the circular-shaped focusing structure 101 is a point radially arranged to the inner onset io101 and directly adjacent to the peripheral clear zone 120.

The width w101 of the circular-shaped focusing structure 101 is the radial distance between the inner onset io101 and the outer onset oo101. The width w102 and w103 are determined accordingly with the inner onsets io102, io103 and the outer onsets oo102, oo103.

The pitch p101 of the circular-shaped focusing structure 101 is the radial distance between the inner onset io101 of the circular-shaped focusing structure 101 and the inner onset io102 of the circular-shaped focusing structure 102. The pitch w102 is determined accordingly with the inner onsets io102 and io103.

The central clear zone width cw110 of the single vision coated lens 100 is the diameter of the central clear zone 110.

The single vision coated lens 100 according to the exemplary embodiment of FIGS. 1 and 2 discloses a central clear zone width cw110 which results in a better acceptance response of the wearer compared to the related-art. Moreover, the length-based fill factor lf101 and the pitch p101 are designed such that, compared to the related art, a better comfort and acceptance response of the wearer is achieved.

Summarizing, the design characteristics of the coated lens 100 with the specific characterizations and wearer satisfaction and visual acuity when looking through the periphery of the lens are as follows:

pitch width: 1 mm
cylinder width: 0.5 mm
ADD power: 8D
diameter clear zone: 9.4 mm
length-based fill factor: 50%
satisfaction of wearability (scale 1-10, The subjects of a study evaluated the design characteristics in a range from 1 to 10, wherein 10 equals to best possible wearability of a coated lens (e.g., a single vision coated lens with a length-based fill factor of 0%) and 1 equals to the worst possible wearability of a coated lens (e.g., a single vision coated lens with a length-based fill factor of 100%). A satisfaction of wearability greater or equal to 4.0 is considered as sufficient, hence children would probably accept such lenses with the satisfaction of wearability and would probably not to tend to dismiss such a coated lens): 6.1
visual acuity @ 20°: 0.0 log MAR.

I Manufacture of the Coated Lenses

Examples 1 to 6

A transparent stamp comprising a structure was provided, the structure was made by precision machining in form of recesses in the concave surface of the transparent stamp. The so obtained concave surface of the transparent stamp was configured to provide five ring-shaped focusing structures to a coating composition. Each ring-shaped focusing structure formed a ring of contiguously connected lenslets on the coating composition. The transparent stamp was made of cyclic block copolymers ViviOn™ 1325, company USI Corporation. The radius of the concave surface of the transparent stamp was 175 mm.

A coating composition comprising 58 g of trimethylol-propane triglycidyl ether, 38 g of pentaerythritol tetraacrylate and 4 g of triarylsulfonium hexafluorophosphate (50% in propylene carbonate) was stirred until homogenous. The respective volume of the coating composition given in Table 1 below was applied to the concave surface of the stamp in form of a drop. The front surface of the respective lens substrate given in Table 1 below was placed on the coating composition on the stamp. The radius of the convex front surface of the respective lens substrate was 175 mm. A press force as given in Table 1 below was applied to the back surface of the respective lens substrate, thereby the coating composition spread to cover the complete convex front surface of the respective lens substrate and to fill the recesses in the concave surface of the transparent stamp. After UV precuring the coating composition through the stamp using the LED curing lamp Delolux 20, company DELO, with wavelength 365 nm for the time and with the UV dose given in Table 1 below, the stamp was detached from the so coated lens. The obtained coated lens comprised the at least one ring-shaped focusing structure in form of protrusions protruding from the outermost surface of the precured coating composition. The precured coating composition was thermally cured for 2 hours at a temperature of 100° C.

TABLE 1

| Example | Lens substrate, uncut lens | Volume of coating composition [ml] | Viscosity of coating composition [mPas] | Press force [g] | UV dose [J/cm²] | Time [s] | Coating thickness [μm] |
|---|---|---|---|---|---|---|---|
| 1 | 1.5 CR 39 | 0.7 | 300 | 0 | 10.5 | 40 | 80 |
| 2 | 1.60 MR-8 | 0.7 | | 400 | 10.5 | 80 | 65 |
| 3 | 1.67 MR-7 | 0.6 | | 500 | 10.5 | 80 | 55 |
| 4 | 1.67 MR-10 | 0.6 | | 500 | 10.5 | 80 | 58 |
| 5 | 1.74 MR-174 | 0.7 | | 400 | 10.5 | 80 | 62 |
| 6 | 1.53 Trivex | 0.7 | | 400 | 10.5 | 40 | 60 |

The so obtained coated lens was further coated by dip coating, on the back surface of the lens substrate and on the outermost surface of the coating comprised on the front surface of the respective lens substrate, with a primer coating composition.

The so obtained coated lens was further coated by dip coating with hard coating composition for example a hard coating composition according to EP 2 578 649 A1, example 2, and the primer coating composition and the hard coating composition were thermally cured for 3 h at a temperature of 110° C., thus resulting in a primer coating thickness each of 0.5 μm and a hard coating thickness each of 2.0 μm.

To the so obtained coated lens an anti-reflective coating resulting in a five-layer stack, beginning from each outer-concave back surface of the respective lens substrate was 175 mm. A press force as given in Table 2 below was applied to the opposite surface of the transparent stamp, i.e., to the surface of the transparent stamp not comprising the structure, thereby the coating composition spread to cover the complete concave back surface of the respective lens substrate. After UV precuring the coating composition through the stamp using the LED curing lamp Delolux 20, company DELO, with wavelength 365 nm for the time and with the UV dose given in Table 2 below, the stamp was detached from the so coated lens. The obtained coated lens comprised the at least one ring-shaped focusing structure in form of protrusions protruding from the outermost surface of the precured coating composition. The precured coating composition was thermally cured for 2 hours at a temperature of 100° C.

TABLE 2

| Example | Lens substrate, uncut lens | Volume of coating composition [ml] | Viscosity of coating composition [mPas] | Press force [g] | UV dose [J/cm²] | Time [s] | Coating thickness [μm] |
|---|---|---|---|---|---|---|---|
| 7 | 1.5 CR 39 | 1.5 | 300 | 1000 | 10.5 | 40 | 152 |
| 8 | 1.60 MR-8 | | | 1200 | 10.5 | 80 | 103 |
| 9 | 1.67 MR-7 | | | 1000 | 10.5 | 80 | 145 |
| 10 | 1.67 MR-10 | | | 800 | 10.5 | 80 | 158 |
| 11 | 1.74 MR-174 | | | 1200 | 10.5 | 80 | 121 |
| 12 | 1.53 Trivex | | | 800 | 10.5 | 40 | 166 | most surface of the hard coating with $SiO_2$ (30 nm), $CrO_2$ (30 nm), $SiO_2$ (20 nm), $CrO_2$ (60 nm), $SiO_2$ (90 nm), was deposited under vacuum.

Finally, the so obtained coated lens was coated on each outermost stack layer of the anti-reflective coating with the clean coating composition Cotec 300+, company COTECH GmbH, resulting in a clean coating of 1 nm thickness.

Examples 7 to 12

A transparent stamp comprising a structure is provided, the structure was made by precision machining in form of recesses in the convex surface of the transparent stamp. The so obtained convex surface of the transparent stamp was configured to provide at least one ring-shaped focusing structure to a coating composition. The transparent stamp was made of cyclic block copolymers ViviOn™ 1325, company USI Corporation. The radius of the convex surface of the transparent stamp was 175 mm.

The pressure sensitive acrylate-based adhesive DELO PHOTOBOND PS4130, company DELO, was applied as coating composition in the respective volume in form of a drop to the concave back surface of the respective lens substrate, both as given in Table 2 below. The radius of the The so obtained coated lens was further coated by dip coating, on the front surface of the lens substrate and on the outermost surface of the coating comprised on the back surface of the respective lens substrate, with a primer coating composition.

The so obtained coated lens was further coated by dip coating with a hard coating composition, for example a hard coating composition according to EP 2 578 649 A1, example 2, and the primer coating composition and the hard coating composition were thermally cured for 3 h at a temperature of 110° C., thus resulting in a primer coating thickness each of 1.5 μm and a hard coating thickness each of 3.0 μm.

To the so obtained coated lens an anti-reflective coating resulting in a five-layer stack, beginning from each outermost surface of the hard coating with $SiO_2$ (30 nm), $CrO_2$ (30 nm), $SiO_2$ (20 nm), $CrO_2$ (60 nm), $SiO_2$ (90 nm), was deposited under vacuum.

Finally, the so obtained coated lens was coated on each outermost stack layer of the anti-reflective coating with the clean coating composition Cotec 300+, company COTECH GmbH, resulting in a clean coating of 2 nm thickness.

Examples 13 to 18

The coated lenses according to the examples 13 to 18 were prepared as the coated lenses according to the examples 1 to 6, except that instead of the primer coating composition and the hard coating composition only the hard coating composition, for example the hard coating composition according to EP 2 578 649 A1, example 2, is applied by dip coating to the obtained coated lens, i.e., to the back surface of the respective lens substrate and the outermost surface of the coating comprised on the front surface of the respective lens substrate. The hard coating composition was thermally cured for 3 h at a temperature of 110° C. to result in a hard coating having a thickness, each on the front surface and on the back surface of the resulting coated lens of 1.2 μm.

Example 19

The hard coating composition according to EP 2 578 649 A1, example 2, was applied by spin coating to the concave surface of a transparent stamp according to the one provided in examples 1 to 6. The applied hard coating composition was precured for 10 minutes at a temperature of 60° C., thus resulting in a precured hard coating of a thickness of 2.7 μm, the thickness not taking into consideration the filled recesses in the concave surface of the transparent stamp.

A coating composition comprising 58 g of trimethylolpropane triglycidyl ether, 38 g of pentaerythritol tetraacrylate and 4 g of triarylsulfonium hexafluorophosphate (50% in propylene carbonate) was stirred until homogenous. 0.7 ml of the coating composition was applied to the precured hard coating in form of a drop. The convex front surface of a lens substrate based on 1.60 MR-8 (uncut lens) with a radius of the convex front surface of 175 mm was placed on the coating composition. A press force of 400 g was applied to the back surface of the lens substrate, thereby the coating composition spread to cover the complete surface of the precured hard coating. After UV precuring the coating composition through the stamp using the LED curing lamp Delolux 20, company DELO, with wavelength 365 nm for 80 s and with a UV dose of 10.5 J/cm², the stamp was detached from the so coated lens. The obtained coated lens comprised the at least one ring-shaped focusing structure in form of protrusions protruding from the outermost surface of the precured hard coating composition. The precured coating compositions were thermally cured for 2 hours at a temperature of 100° C.

The hard coating composition according to EP 2 578 649 A1, example 2, was applied by spin coating on the back surface of the lens substrate and thermally cured for 3 h at a temperature of 110° C., thus resulting in a hard coating of a thickness of 3.0 μm.

Both, to the front surface and the back surface of the resulting coated lens, the anti-reflective coating and the clean coating of the examples 1 to 6 were applied.

Example 20

The coated lens according to the example 20 was prepared as the coated lens according to example 19, except that the convex front surface of the lens substrate comprised four rings of form of recesses, the recesses in each ring were formed as contiguously connected recesses. The recesses in the convex front surface of the lens substrate were made via a molding process.

Examples 21 to 26

A transparent stamp comprising a smooth concave surface is provided, i.e., a transparent stamp having a concave surface without a structure is provided. The transparent stamp was made of cyclic block copolymers ViviOn™ 1325, company USI Corporation. The radius of the concave surface of the transparent stamp was 175 mm.

The pressure sensitive acrylate-based adhesive DELO PHOTOBOND PS4130, company DELO, was applied as first coating composition in the respective volume as given with respect to coating composition 1 in Table 3 below, in form of a drop to the smooth concave surface of the transparent stamp. The front surface of the respective lens substrate given in Table 3 below was placed on the coating composition on the stamp. The radius of the convex front surface of the respective lens substrate was 175 mm. The convex front surface of the lens substrate comprised four rings of form of recesses, the recesses in each ring were formed as contiguously connected recesses. The recesses in the convex front surface of the lens substrate were made via a molding process. A press force as given in Table 3 below was applied to the back surface of the respective lens substrate, thereby the coating composition spread to cover the complete convex front surface of the respective lens substrate and filled the recesses in the convex front surface of the respective lens substrate. After UV precuring the coating composition 1 through the stamp using the LED curing lamp Delolux 20, company DELO, with wavelength 365 nm for the time and with the UV dose given in Table 3 below with respect to coating composition 1, the stamp was detached from the so coated lens.

A second coating composition comprising 58 g of trimethylolpropane triglycidyl ether, 38 g of pentaerythritol tetraacrylate and 4 g of triarylsulfonium hexafluorophosphate (50% in propylene carbonate) was stirred until homogenous. The respective volume of the second coating composition given in Table 3 below with respect to coating composition 2 was applied to the concave surface of the stamp used in examples 1 to 6 in form of a drop.

The obtained coated lens was placed with the front surface, i.e., the outermost surface of the precured coating composition 1, on the coating composition 2 applied to the concave structured surface of the transparent stamp used in examples 1 to 6. A press force as given in Table 3 below was applied to the back surface of the coated lens, i.e., to the respective lens substrate, thereby the coating composition 2 spread to cover the complete front surface of the coated lens and to fill the recesses in the concave surface of the transparent stamp. After UV precuring the coating composition 2 through the stamp using the LED curing lamp Delolux 20, company DELO, with wavelength 365 nm for the time and with the UV dose given in Table 3 below, the stamp was detached from the so coated lens. The obtained coated lens comprised the at least one ring-shaped focusing structure in form of protrusions protruding from the outermost surface of the precured coating composition 2. The precured coating compositions 1 and 2 were thermally cured for 2 hours at a temperature of 100° C.

TABLE 3

| Example | Lens substrate, uncut lens | Volume of coating composition [ml] | Press force [g] | UV dose [J/cm²] | Time [s] |
|---|---|---|---|---|---|
| | | Coating composition 1 (DELO PHOTOBOND PS4130) | | | |
| 21 | 1.5 CR 39 | 1.5 | 1000 | 8 | 40 |
| 22 | 1.60 MR-8 | | | | |
| 23 | 1.67 MR-7 | | | | |
| 24 | 1.67 MR-10 | | | | |
| 25 | 1.74 MR-174 | | | | |
| 26 | 1.53 Trivex | | | | |
| | | Coating composition 2 | | | |
| 21 | 1.5 CR 39 | 0.7 | 400 | 10 | 80 |
| 22 | 1.60 MR-8 | | | | |
| 23 | 1.67 MR-7 | | | | |
| 24 | 1.67 MR-10 | | | | |
| 25 | 1.74 MR-174 | | | | |
| 26 | 1.53 Trivex | | | | |

To the front surface and to the back surface of the obtained coated lens, the primer coating composition, the hard coating composition, the anti-reflective coating, and the clean coating as in examples 1 to 6 were applied.

Examples 27 to 32

The coated lenses according to the examples 27 to 32 were obtained as those according to examples 21 to 26, except that instead of coating composition 1 and coating composition 2 only coating composition 1 (DELO PHOTO-BOND PS4130) was used.

Example 33 to 38

The coated lenses according to the examples 33 to 38 were prepared as those according to examples 21 to 26, except that the convex front surface of the lens substrate comprised four rings of form of recesses, the recesses in each ring were formed as contiguously connected recesses. The recesses in the convex front surface of the lens substrate were made via a molding process.

Examples 39 to 44

A transparent stamp as in examples 1 to 6 was provided. Additionally, another transparent stamp comprising a smooth concave surface is provided, i.e., a transparent stamp having a concave surface without a structure is provided. The transparent stamp was made of cyclic block copolymers ViviOn™ 1325, company USI Corporation. The radius of the concave surface of the transparent stamp was 175 mm.

The pressure sensitive acrylate-based adhesive DELO PHOTOBOND PS4130, company DELO, was applied as first coating composition in the respective volume as given with respect to coating composition 1 in Table 4 below, in form of a drop to the structured concave surface of the transparent stamp used in examples 1 to 6. The front surface of the respective lens substrate given in Table 4 below was placed on the coating composition on the stamp. The radius of the convex front surface of the respective lens substrate was 175 mm. A press force as given in Table 4 below was applied to the back surface of the respective lens substrate, thereby the coating composition spread to cover the complete convex front surface of the respective lens substrate and to fill the recesses in the concave surface of the transparent stamp. After UV precuring the coating composition 1 through the stamp using the LED curing lamp Delolux 20, company DELO, with wavelength 365 nm for the time and with the UV dose given in Table 4 below with respect to coating composition 1, the stamp was detached from the so coated lens. The coated lens comprised protrusion protruding the outermost surface of the precured coating composition 1.

A second coating composition comprising 58 g of trimethylolpropane triglycidyl ether, 38 g of pentaerythritol tetraacrylate, and 4 g of triarylsulfonium hexafluorophosphate (50% in propylene carbonate) was stirred until homogenous. The respective volume of the second coating composition given in Table 4 below with respect to coating composition 2 was applied to the concave smooth surface of the stamp described before in form of a drop.

The obtained coated lens was placed with the front surface, i.e., the outermost surface of the precured coating composition 1, on the coating composition 2 applied to the concave smooth surface of the transparent stamp. A press force as given in Table 4 below was applied to the back surface of the coated lens, i.e., to the respective lens substrate, thereby the coating composition 2 spread to cover the complete front surface of the coated lens, including the protrusions obtained by coating composition 1. After UV precuring the coating composition 2 through the stamp using the LED curing lamp Delolux 20, company DELO, with wavelength 365 nm for the time and with the UV dose given in Table 4 below, the stamp was detached from the so coated lens. The obtained coated lens comprised the at least one ring-shaped focusing structure in form of protrusions of precured coating composition 1 hidden within the precured coating composition 2. The precured coating compositions 1 and 2 were thermally cured for 2 hours at a temperature of 100° C.

TABLE 4

| Example | Lens substrate, uncut lens | Volume of coating composition [ml] | Press force [g] | UV dose [J/cm²] | time [s] |
|---|---|---|---|---|---|
| | | Coating composition 1 (DELO PHOTOBOND PS4130) | | | |
| 39 | 1.5 CR 39 | 1.5 | 1000 | 8 | 40 |
| 40 | 1.60 MR-8 | | | | |
| 41 | 1.67 MR-7 | | | | |
| 42 | 1.67 MR-10 | | | | |
| 43 | 1.74 MR-174 | | | | |
| 44 | 1.53 Trivex | | | | |
| | | Coating composition 2 | | | |
| 39 | 1.5 CR 39 | 0.7 | 400 | 10 | 80 |
| 40 | 1.60 MR-8 | | | | |
| 41 | 1.67 MR-7 | | | | |
| 42 | 1.67 MR-10 | | | | |
| 43 | 1.74 MR-174 | | | | |
| 44 | 1.53 Trivex | | | | |

To the front surface and to the back surface of the obtained coated lens, the primer coating composition, the hard coating composition, the anti-reflective coating and the clean coating as in examples 1 to 6 were applied.

Examples 45 to 50

The coated lenses according to the examples 38 to 43 were obtained as the coated lenses according to the examples 32 to 37, except that instead of coating composition 1 coating composition 2 and instead of coating composition 2 coating composition 1 was used.

Comparative Example 1

A transparent stamp as in examples 1 to 6 was provided.

0.8 ml of the hard coating composition according to EP 2 578 649 A1, example 2, was applied in form of a drop to the concave surface of the transparent stamp. The convex surface of a lens substrate based on 1.60 MR-8 (uncut lens) with a radius of the convex front surface of 175 mm was placed on the hard coating composition. The hard coating composition spread to cover the complete surface of the lens substrate and to fill the recesses in the concave surface of the transparent stamp. After thermally curing the hard coating composition for 3 h at a temperature of 100° C., the stamp was detached from the hard coated lens. The obtained coated lens comprised the at least one ring-shaped focusing structure in form of protrusions protruding from the outermost surface of the hard coating.

Comparative Example 2

The coated lens according to comparative example 2 was obtained as the coated lens of example 2, except that both the primer coating composition and the hard coating composition of example 2 were not applied.

Comparative Example 3

The coated lens according to comparative example 3 was obtained as the coated lens of example 2, except that the coating composition applied in form of a drop to the concave surface of the transparent stamp comprised 9.5 g of trimethylolpropane triglycidyl ether, 86.5 g of pentaerythritol tetraacrylate and 4 g of triarylsulfonium hexafluorophosphate (50% in propylene carbonate).

Comparative Example 4

The coated lens according to comparative example 4 was obtained as the coated lens according to example 3, except that the transparent stamp was based on the polycarbonate LEXAN™ Resin OQ3820, company Sabic Corporation.

Comparative Example 5, Stamping a Coating

A transparent stamp as in examples 1 to 6 was provided.

A coating composition comprising 58 g of trimethylolpropane triglycidyl ether, 38 g of pentaerythritol tetraacrylate, and 4 g of triarylsulfonium hexafluorophosphate (50% in propylene carbonate) was stirred until homogenous and applied in a thickness of 40 mm to the front surface of a substrate based on 1.60 MR-8 (uncut lens), the lens substrate had a radius of the convex front surface of 175 mm. The coating composition was precured for 80 s with a UV dose of 10.5 J/cm² using the LED curing lamp DELOLUX 20 with a wavelength of 365 nm, followed by thermal cure for 2 h at a temperature of 100° C. The coated front surface of the obtained coated lens was placed and pressed under a press force of 1 MPa and application of a temperature of 80° C. to the concave surface of the transparent stamp. The coated lens and the stamp were detached, the coatings as in examples 1 to 6 were applied to both the front surface and the back surface of the obtained coated lens.

II Characterization of the Coated Lenses

TABLE 5

| Coated Lens | Detaching performance (Detach the precured coated lens from the stamp) | Cosmetic | Adhesion of anti-reflection coating | Adhesion of coating adjacent to lens substrate | Design Tangential radius of lenslet [mm] | Tangential Radius of Lenslet after AR coating [mm] |
|---|---|---|---|---|---|---|
| Example 2 | Easy to detach | Pass | Pass | Pass | 40.85 | 60.62 |
| Example 14 | Easy to detach | Pass | Pass | Pass | 40.85 | 48.5 |
| Example 19 | Easy to detach | Pass | Pass | Pass | 40.85 | 40.84 |
| Example 20 | Easy to detach | Pass | Pass | Pass | −57(radius of the lenslet on lens substrate) 50 (radius of the lenslet on the hard coating) | −57 (radius of the lenslet on lens substrate 50.5 (radius of the lenslet on the hard coating |
| Comparative Example 1 | Easy to detach | Bubbles and cracks on the hard coating; due to the volatilizable components in the hard coating composition. | NA | NA | 40.85 | NA |
| Comparative Example 2 | Easy to detach | Pass | Fail | Pass | 40.85 | 41 |
| Comparative Example 3 | Easy to detach | Pass | Pass | Fai | 40.85 | 60 |
| Comparative Example 4 | stamp damaged during detaching, due to strong adhesion | NA | NA | NA | 40.85 | NA |
| Comparative Example 5 | Easy to detach | Pass | Pass | Pass | 40.85 | Lenslet not detected |

The cosmetic of the coated lenses according to the examples and comparative examples was determined by visual inspection.

The adhesion of the coating to the coated lens was evaluated by the cross-cut test. This test applies and removes pressure sensitive tape (3M Scotch 600) over the two cuts made in the coating and into the substrate. The cuts are made by a blade tool with 6 blades parallelly installed, 25 grids of size 1 mm×1 mm is formed by cutting perpendicularly. The ranking is made based on the percentage of the delaminated area to the grids area according to BYK Gardner catalogue "QC solutions for coatings and plastics," 2018, page 158. If the delaminated area is more than 5%, the adhesion is considered as fail.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of consisting only of. The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A coated lens comprising:

a coating, the coating being based on a coating composition, wherein the coating composition contains:

a stamping, the coating composition including at least one component selected from the group consisting of at least one epoxide component and at least one (meth) acrylate component, and the stamping of the coating containing one ring-shaped focusing structure or more ring-shaped focusing structures, wherein the one ring-shaped structure or more ring-shaped structures surround a structure-free central clear zone and form a path that runs from a starting point within the respective structure around the central clear zone and to the starting point again, and wherein the one ring-shaped structure or more ring-shaped structures have a constant width.

2. The coated lens according to claim 1, wherein the one ring-shaped focusing structure has a respective width or the more ring-shaped focusing structures have a respective width, and at least one additional feature selected from the group consisting of:

(i) the central clear zone having a central clear zone width within a range of 6 mm to 9.4 mm and the width being equal to or lower than 0.7 mm;

(ii) the width being lower than 0.5 mm;

(iii) a surface-based fill factor defined as a surface area ratio of:

a surface area of an innermost ring-shaped focusing structure of the more ring-shaped focusing structures, and a sum of the surface area of the innermost ring-shaped focusing structure of the more ring-shaped focusing structures and an area of a peripheral clear zone, the surface-based fill factor being within a range of larger than 17% and equal to or lower than 70% for the width of the more ring-shaped focusing structures in a range of 0.6 mm to 0.7 mm;

(iv) the surface-based fill factor defined as the surface area ratio of:

the surface area of the innermost ring-shaped focusing structure of the more ring-shaped focusing structures, and the sum of the surface area of the innermost ring-shaped focusing structure of the more ring-shaped focusing structures and the area of the peripheral clear zone, the surface-based fill factor being within a range of larger than 15% and equal to or lower than 60% for the width of the more ring-shaped focusing structures in a range of 0.5 mm to 0.6 mm;

(v) the surface-based fill factor defined as the surface area ratio of:

the surface area of the innermost ring-shaped focusing structure of the more ring-shaped focusing structures, and the sum of the surface area of the innermost ring-shaped focusing structure of the more ring-shaped focusing structures and the area of the peripheral clear zone, the surface-based fill factor being within a range of larger than 6% and equal to or lower than 50% for the width of the more ring-shaped focusing structures lower than 0.5 mm.

3. The coated lens according to claim 2, wherein the constant width is within at least one range selected from the group of ranges consisting of:

(i) the width is within a range of larger than 0.2 mm and equal to or lower than 0.7 mm;

(ii) the width is within a range of larger than 0.3 mm and equal to or lower than 0.7 mm;

(iii) the width is equal to or lower than 0.6 mm;

(iv) the width is within a range of larger than 0.2 mm and equal to or lower than 0.6 mm;

(v) the width is within a range of larger than 0.3 mm and equal to or lower than 0.6 mm;

(vi) the width is equal to or lower than 0.5 mm;

(vii) the width is within a range of larger than 0.2 mm and equal to or lower than 0.5 mm; and (viii) the width is within a range of larger than 0.3 mm and equal to or lower than 0.5 mm.

4. The coated lens according to claim 2, wherein the central clear zone width is within at least one range selected from the group of ranges consisting of:

(i) the central clear zone width is within a range of larger than 6 mm and equal to or lower than 7 mm; and (ii) the central clear zone width is within a range of larger than 7 mm and equal to or lower than 9.4 mm.

5. The coated lens according to claim 1, wherein the at least one ring-shaped focusing structure provides an additional power as compared to the central clear zone within at least one range selected from the group of ranges consisting of:

(i) the additional power is within a range of larger than 6 dioptres and equal to or lower than 12 dioptres;

(ii) the additional power is within a range of larger than 7 dioptres and equal to or lower than 11 dioptres; and (iii) the additional power is within a range of larger than 8 dioptres and equal to or lower than 10 dioptres.

6. The coated lens according to claim 1, wherein the coating composition comprises the at least one epoxide component and the at least one (meth)acrylate component in a weight ratio selected from at least one of the following ranges:

the weight ratio of epoxide component to (meth)acrylate component being within a range of from 0.64 to 4.3, the weight ratio of epoxide component to (meth)acrylate component being within a range of from 0.7 to 4.1, the weight ratio of epoxide component to (meth)acrylate component being within a range of from 0.8 to 4.0, and the weight ratio of epoxide component to (meth)acrylate component being within a range of from 1.0 to 3.0.

7. The coated lens according to claim 1, wherein the coating composition comprises the at least one epoxide component in a total amount within a range selected from at least one of the following ranges:

the total amount being within a range of from 39% by weight to 81% by weight, the total amount being within a range of from 45% by weight to 75% by weight, the total amount being within a range of from 50% by weight to 70% by weight, and the total amount being within a range of from 55% by weight to 65% by weight, each total amount of the at least one epoxide component being based on the total weight of the sum of the at least one epoxide component and the at least one (meth)acrylate component, and the at least one (meth)acrylate component in the total amount within a range selected from at least one of the following ranges:

the total amount being within a range of from 19% by weight to 61% by weight, the total amount being within a range of from 25% by weight to 55% by weight, the total amount being within a range of from 30% by weight to 50% by weight, and the total amount being within a range of from 35% by weight to 45% by weight, each total amount of the at least one (meth)acrylate component being based on the total weight of the sum of the at least one epoxide component and the at least one (meth)acrylate component.

8. The coated lens according to claim 1, wherein the coating composition has a viscosity within a range selected from at least one of the following ranges:

the viscosity being within a range of from 50 mPas to 600 mPas, the viscosity being within a range of from 100 mPas to 500 mPas, the viscosity being within a range of from 150 mPas to 400 mPas, and the viscosity being within a range of from 250 mPas to 350 mPas, each viscosity being determined using an Ubbelohde viscometer at a working temperature being within a range selected from at least one of the following ranges:

the working temperature being within a range of from −20° C. to 100° C., the working temperature being within a range of from 0° C. to 60° C., the working temperature being within a range of from 10° C. to 40° C., and the working temperature being within a range of from 17° C. to 30° C.

9. The coated lens according to claim 1, wherein the coating has an indentation hardness selected from at least one of the following ranges:

the indentation hardness being within a range of from 50 MPa to 600 MPa, the indentation hardness being within a range of from 100 MPa to 400 MPa, the indentation hardness being within a range of from 150 MPa to 350 MPa, and the indentation hardness being within a range of from 200 MPa to 300 MPa.

10. The coated lens according to claim 1, wherein the coated lens comprises an additional coating, the additional coating being an outermost coating and being selected from at least one of the group consisting of:

a hard coating, a coating based on the coating composition, or the coating based on the composition and the hard coating, the hard coating being the outermost coating thereof.

11. The coated lens according to claim 10, wherein the additional coating is configured to adapt to the stamping.

12. A method for manufacturing a coated lens, the method comprising a step of:

stamping a first coating composition, thereby transferring at least one of a second coating composition and a second coating to the first coating composition, the at least one of the second coating composition and the second coating containing a stamping having one ring-shaped structure or more ring-shaped structures, wherein the one ring-shaped structure or more ring-shaped structures surround a structure-free zone and form a path that runs from a starting point within the respective structure around the structure-free zone and to the starting point again, and wherein the one ring-shaped structure or more ring-shaped structures have a constant width.

13. The method according to claim 12, wherein the first coating composition comprises the at least one epoxide component and the at least one (meth)acrylate component in a weight ratio selected from at least one of the following ranges:

the weight ratio of epoxide component to (meth)acrylate component being within a range of from 0.64 to 4.3, the weight ratio of epoxide component to (meth)acrylate component being within a range of from 0.7 to 4.1, the weight ratio of epoxide component to (meth)acrylate component being within a range of from 0.8 to 4.0, and the weight ratio of epoxide component to (meth)acrylate component being within a range of from 1.0 to 3.0.

14. The method according to claim 12, wherein the first coating composition comprises the at least one epoxide component in a total amount within a range selected from at least one of the following ranges:

the total amount being within a range of from 39% by weight to 81% by weight, the total amount being within a range of from 45% by weight to 75% by weight, the total amount being within a range of from 50% by weight to 70% by weight, and the total amount being within a range of from 55% by weight to 65% by weight, each total amount of the at least one epoxide component being based on the total weight of the sum of the at least one epoxide component and the at least one (meth)acrylate component, and the at least one (meth)acrylate component in the total amount within a range selected from at least one of the following ranges:

the total amount being within a range of from 19% by weight to 61% by weight, the total amount being within a range of from 25% by weight to 55% by weight, the total amount being within a range of from 30% by weight to 50% by weight, and the total amount being within a range of from 35% by weight to 45% by weight, each total amount of the at least one (meth)acrylate component being based on the total weight of the sum of the at least one epoxide component and the at least one (meth)acrylate component.

15. The method according to claim 12, wherein the first coating composition has a viscosity within a range selected from at least one of the following ranges:

the viscosity being within a range of from 50 mPas to 600 mPas, the viscosity being within a range of from 100 mPas to 500 mPas, the viscosity being within a range of from 150 mPas to 400 mPas, and the viscosity being within a range of from 250 mPas to 350 mPas, each viscosity being determined using an Ubbelohde viscometer at a working temperature being within a range selected from at least one of the following ranges:

the working temperature being within a range of from −20° C. to 100° C., the working temperature being within a range of from 0° C. to 60° C., the working temperature being within a range of from 10° C. to 40° C., and the working temperature being within a range of from 17° C. to 30° C.

16. The method according to claim 12, wherein the second coating composition is a hard coating composition, and the second coating is a hard coating.

17. The method according to claim 12, wherein the method comprises the additional step of:

curing the first coating composition and the second coating composition resulting in a coating and a hard coating.

18. The method according to claim 12, wherein in a domain of the stamping the stamping provides a surface power to a lens surface comprising the hard coating which is different from a surface power of the lens surface outside the domain of the stamping, a difference in surface power being within at least one range selected from the following ranges:

the difference in surface power is within a range of larger than 6 dioptres and equal to or lower than 12 dioptres;

the difference in surface power is within a range of larger than 7 dioptres and equal to or lower than 11 dioptres; and the difference in surface power is within a range of larger than 8 dioptres and equal to or lower than 10 dioptres.

* * * * *